United States Patent [19]
Kumada

[11] Patent Number: 6,044,173
[45] Date of Patent: Mar. 28, 2000

[54] IMAGE PROCESSING APPARATUS AND METHOD

[75] Inventor: Shuichi Kumada, Yokohama, Japan

[73] Assignee: Canon Kabushiki Kaisha, Tokyo, Japan

[21] Appl. No.: 08/964,413

[22] Filed: Nov. 4, 1997

Related U.S. Application Data

[63] Continuation of application No. 08/380,633, Jan. 30, 1995, abandoned.

[30] Foreign Application Priority Data

Jan. 31, 1994 [JP] Japan .................................. 6-009565

[51] Int. Cl.[7] .............................. G06K 9/00; G03F 3/08
[52] U.S. Cl. .......................................... 382/167; 358/518
[58] Field of Search .................................. 382/162, 166, 382/167, 302; 358/518–523, 401, 501; 395/109; 345/153, 154, 418, 431

[56] References Cited

U.S. PATENT DOCUMENTS

| | | | |
|---|---|---|---|
| 5,185,661 | 2/1993 | Ng ........................................... | 358/505 |
| 5,282,046 | 1/1994 | Yamaguchi ............................. | 358/296 |
| 5,309,257 | 5/1994 | Bonino et al. ......................... | 358/504 |
| 5,311,295 | 5/1994 | Tallman et al. ........................ | 348/180 |
| 5,319,473 | 6/1994 | Harrington ............................. | 358/501 |
| 5,323,249 | 6/1994 | Liang ...................................... | 358/518 |
| 5,349,452 | 9/1994 | Maeda et al. .......................... | 358/527 |
| 5,416,890 | 5/1995 | Beretta ................................... | 395/131 |
| 5,432,906 | 7/1995 | Newman et al. ....................... | 395/162 |
| 5,436,739 | 7/1995 | Imao et al. ............................. | 358/518 |
| 5,448,379 | 9/1995 | Ishihara et al. ........................ | 358/518 |
| 5,463,480 | 10/1995 | MacDonald et al. .................. | 358/520 |
| 5,500,921 | 3/1996 | Ruetz ..................................... | 395/131 |

FOREIGN PATENT DOCUMENTS

| | | |
|---|---|---|
| 0321983 | 6/1989 | European Pat. Off. . |
| 0606781 | 7/1994 | European Pat. Off. . |
| 9206557 | 4/1992 | WIPO . |

*Primary Examiner*—Bhavesh Mehta
*Attorney, Agent, or Firm*—Fitzpatrick, Cella, Harper & Scinto

[57] ABSTRACT

An image processing apparatus includes storing means for storing a plurality of profiles, selecting means for selecting a profile from the plurality of profiles based on profile indication information, and processing means for performing a color matching process on color image data using a selected profile. Informing means informs a user that the profile corresponding to the profile indication information has not been stored in the storing means in a case that the profile corresponding to the profile indication information has not been stored in the storing means.

18 Claims, 39 Drawing Sheets

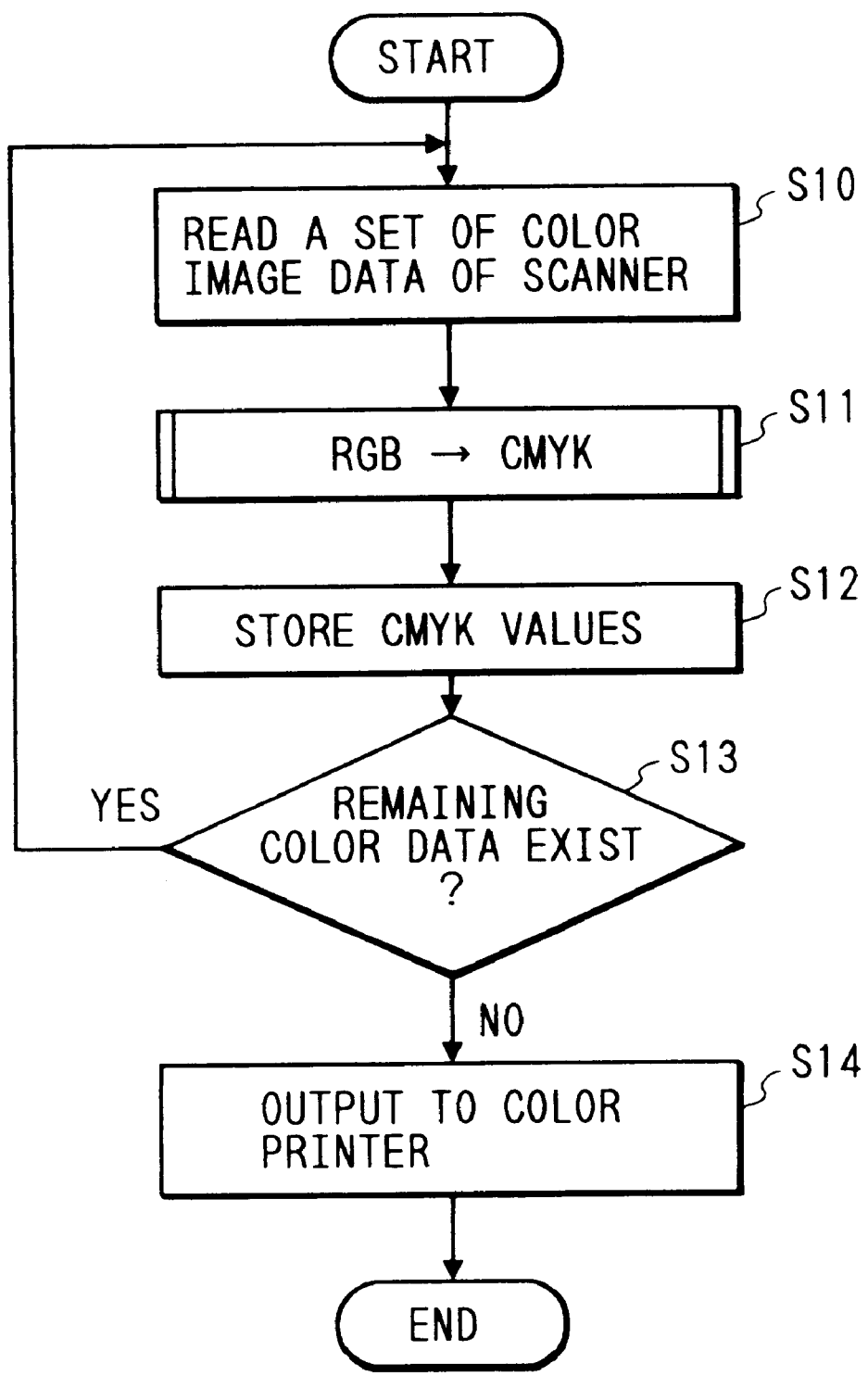

FIG. 15

| DEVICE MODEL |
| --- |
| DATA SIZE |
| VERSION |
| Gamut checktype |
| OFFSET VALUE FOR CMM PROC INFORMATION STORAGE UNIT |
| OFFSET VALUE FOR INFORMATION STORAGE UNIT FOR DEVICE COLOR GAMUT CHECK |

FIG. 16

| HEADER FOR CMM1 |
| --- |
| HEADER FOR CMM2 |
| ⋮ |
| HEADER FOR CMMℓ |
| DATA FOR CMM1 |
| DATA FOR CMM2 |
| ⋮ |
| DATA FOR CMMℓ |

FIG. 29

$$\begin{pmatrix} X \\ Y \\ Z \end{pmatrix} = \begin{pmatrix} P_{11} & P_{12} & P_{13} \\ P_{21} & P_{22} & P_{23} \\ P_{31} & P_{32} & P_{33} \end{pmatrix} \begin{pmatrix} R \\ G \\ B \end{pmatrix}$$

FIG. 30

$$\begin{pmatrix} R \\ G \\ B \end{pmatrix} = \begin{pmatrix} q_{11} & q_{12} & q_{13} \\ q_{21} & q_{22} & q_{23} \\ q_{31} & q_{32} & q_{33} \end{pmatrix} \begin{pmatrix} X \\ Y \\ Z \end{pmatrix}$$

FIG. 34

$$\begin{pmatrix} C \\ M \\ Y \end{pmatrix} = \begin{pmatrix} Y_{11} & Y_{12} & Y_{13} \\ Y_{21} & Y_{22} & Y_{23} \\ Y_{31} & Y_{32} & Y_{33} \end{pmatrix} \begin{pmatrix} C \\ M \\ Y \end{pmatrix}$$

$$\begin{cases} C = \boxed{Y_{11} \cdot C} + \boxed{Y_{12} \cdot M} + \boxed{Y_{13} \cdot Y} \\ M = \boxed{Y_{21} \cdot C} + \boxed{Y_{22} \cdot M} + \boxed{Y_{23} \cdot Y} \\ Y = \boxed{Y_{31} \cdot C} + \boxed{Y_{32} \cdot M} + \boxed{Y_{33} \cdot Y} \end{cases}$$

FIG. 35

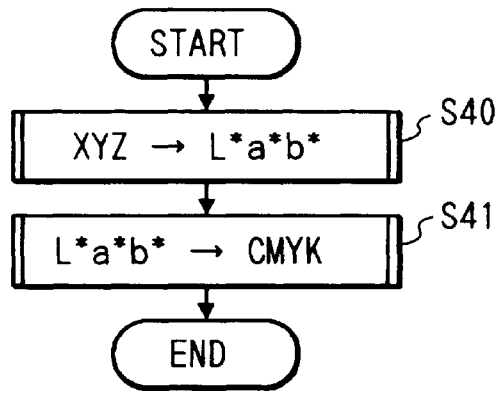

FIG. 36

$$\begin{cases} L^* = \begin{cases} 116(Y/Y_n)^{\frac{1}{3}} - 16 & (Y/Y_n > 0.008856) \\ 903.3(Y/Y_n) & (Y/Y_n < 0.008856) \end{cases} \\ \\ a^* = \begin{cases} 500\left[(X/X_n)^{\frac{1}{3}} - (Y/Y_n)^{\frac{1}{3}}\right] & \begin{matrix} X \\ Y \end{matrix} \begin{pmatrix} X_n > 0.008856 \\ Y_n > 0.008856 \end{pmatrix} \\ 500[f(X/X_n) - f(Y/Y_n)] & \begin{matrix} X \\ Y \end{matrix} \begin{pmatrix} X_n < 0.008856 \\ Y_n < 0.008856 \end{pmatrix} \end{cases} \\ \\ b^* = \begin{cases} 200\left[(Y/Y_n)^{\frac{1}{3}} - (Z/Z_n)^{\frac{1}{3}}\right] & (Z/Z_n > 0.008856) \\ 200[f(Y/Y_n) - f(Z/Z_n)] & (Z/Z_n < 0.008856) \end{cases} \end{cases}$$

WHERE, $f(X/X_n) = 7.787(X/X_n) + 16/116$ $f(Y/Y_n) = 7.787(Y/Y_n) + 16/116$ $f(Z/Z_n) = 7.787(Z/Z_n) + 16/116$

| DEVICE MODEL |
|---|
| DATA SIZE |
| VERSION |
| CMM Subtype |
| Gamut checktype |
| OFFSET VALUE FOR CMM PROC INFORMATION STORAGE UNIT |
| OFFSET VALUE FOR INFORMATION STORAGE UNIT FOR DEVICE COLOR GAMUT CHECK |

FIG. 41 (PRIOR ART)
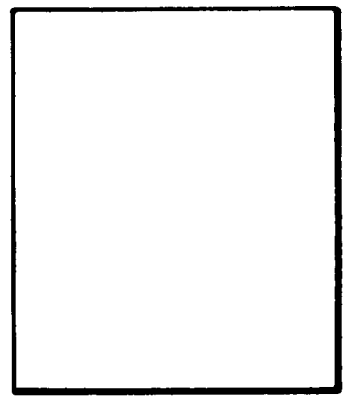
SCANNER PROFILE
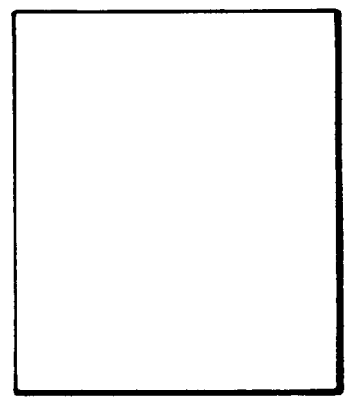
PRINTER PROFILE
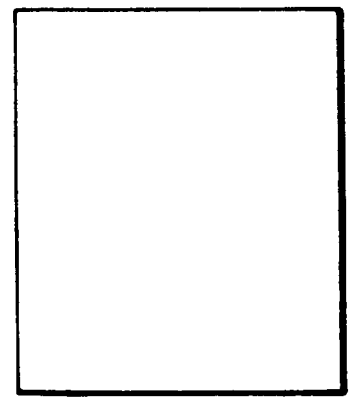
MONITOR PROFILE

IMAGE PROCESSING APPARATUS AND METHOD

This application is continuation of application Ser. No. 08/380,633 filed Jan. 30, 1995, now abandoned.

BACKGROUND OF THE INVENTION

1. Field of the Invention

The present invention relates to an image processing apparatus and an image processing method for image processing in a color management system or the like to faithfully reproduce colors.

2. Related Background Art

As shown in FIG. 40, a color gamut is different from device to device, such as scanner, monitor, printer and the like.

In FIG. 40, x and y denote chromaticity coordinates, and the inside of a graphic is a color gamut.

That is, to reproduce colors absorbing a difference in color gamut, a problem is how a color in a nonoverlapping gamut is to be handled.

For example, a monitor color space is to be converted to a printer color space, a problem is which printer color is used to express a color falling in the monitor color space, but not in the printer color space.

A process related to this is called a color gamut compression process (or color space compression process).

A color gamut compression method is the one for mapping image data to colors expressible on an output device and is usually called CMM (color matching method).

However, in a conventional color management system, only one process method is available for implementing the color matching method.

In the color space conversion process between devices such as scanner, monitor, printer and the like, what process including color space compression is to be executed, i.e. a process method does not depend on devices, but information used for a process depends on devices.

The abovementioned information is stored in a file called a device profile.

For example, the profile of a monitor contains data describing monitor characteristics such as x-y chromaticity values of red, green, blue and white, data on gamma characteristic curves for red, green and blue and the like for the monitor.

Device profiles, as shown in FIG. 41, are called scanner profile, monitor profile, and printer profile in correspondence with individual devices.

In the abovementioned color space conversion, a process is executed using a profile corresponding to a source device and a profile corresponding to a destination device. The former profile is called a source profile, and the latter profile is called a destination profile.

For example, in a conversion from the scanner color space to the monitor color space, the source device is a scanner, and the profile of the scanner is a source profile, while the destination device is a monitor, and the profile of the monitor is a destination profile.

The abovementioned method has involved a problem of a failure to execute image processing by selecting a process of realizing one color matching method according to an application.

SUMMARY OF THE INVENTION

It is an object of the present invention to provide an image processing apparatus and method which has solved the abovementioned problem.

It is an another object of the present invention to allow a process of realizing a color matching process method according to an application of function.

It is a further object of the present invention to allow a color matching process using default information even when a designated color matching process is not available.

It is still another object of the present invention to allow a color matching process method to be selected based on the accuracy of a color matching process.

It is still further object of the present invention to allow a color matching process method to be selected based on time required for a color matching process, i.e. processing time.

It is still further object of the present invention to establish the correspondence of information about a color matching process method with the type of a color matching process method and a process type.

These objectives are achieved by the provision of an image processing apparatus according to a preferred embodiment of the present invention which has designating means for designating one of a plurality of processes of realizing a predetermined type of a color matching method and selecting means for selecting information for use with the designated process and which processes color image data using the selected information.

Other objects and features of the present invention will be apparent from the following description of embodiments and drawings.

BRIEF DESCRIPTION OF THE DRAWINGS

FIG. 4 is a flow chart showing a process of outputting color image data read from a color scanner to a color printer after executing a color matching process thereon;

FIG. 15 shows an example of the structure of a header information unit;

FIG. 16 shows an example of the structure of a CMM process information storage unit;

FIG. 29 shows a relational expression between XYZ data provided for by CIE and RGB data;

FIG. 30 shows a relational expression between XYZ data provided for by CIE and RGB data;

FIG. 34 shows an example of a table for use with process 3 of FIG. 31;

FIG. 35 shows an example of the process of step S127 of FIG. 13 or of step S245 of FIG. 26;

FIG. 36 shows an example of conversion from XYZ data provided for by CIE to L*a*b*;

FIG. 41 shows an example of a device profile type;

DETAILED DESCRIPTION OF THE PREFERRED EMBODIMENTS

Figure 1:
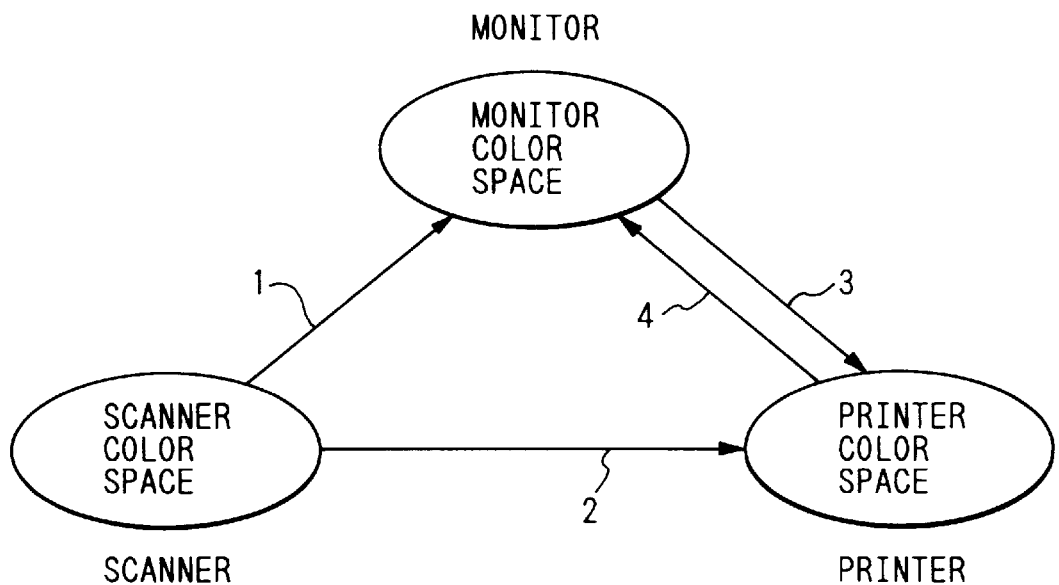
FIG. 1 shows an example of color reproduction in a color management system.

FIG. 1 shows an example of color reproduction in a color management system.

The color management system executes color matching in due consideration of characteristics of color input/output devices.

Three basic color input/output devices, i.e. color scanner, color monitor and color printer, are taken up herein.

In the color management system, characteristics of these three devices need to be considered in a color reproduction process (color matching process), i.e. four color space conversion processes denoted with arrows in FIG. 1.

1. Conversion process from scanner color space to monitor color space

A process for faithfully displaying photograph data read from the scanner on the monitor.

2. Conversion process from scanner color space to printer color space

A process for faithfully printing photograph data read from the scanner on the printer.

3. Conversion process from monitor color space to printer color space

A process for faithfully printing character data, graphics data and the like which have been prepared on the monitor using application software, on the printer.

4. Conversion process from printer color space to monitor color space

A process for previewing the results of printing on the printer on the monitor.

Figures 40, 42:
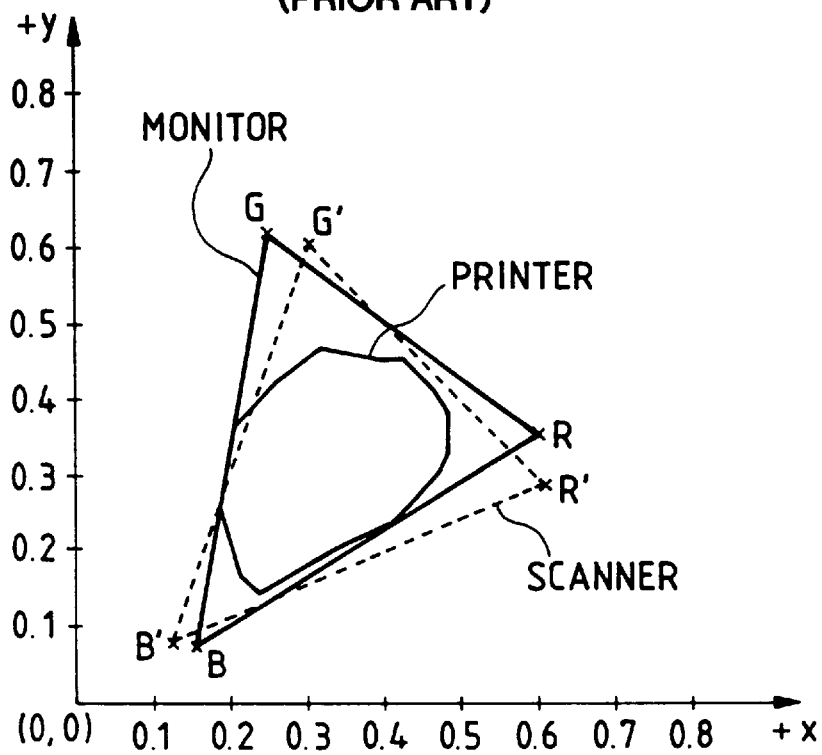
FIG. 40 shows an example illustrating a difference in color gamut among devices.
FIG. 42 shows an example of the structure of a header information unit.

The abovementioned color spaces of three devices depend on individual devices and are different in color gamut as shown in FIG. 40.

There are a plurality of conceivable methods for reproducing colors absorbing the difference in color gamut, which methods are executed in the abovementioned color space conversion processes.

Figure 37:
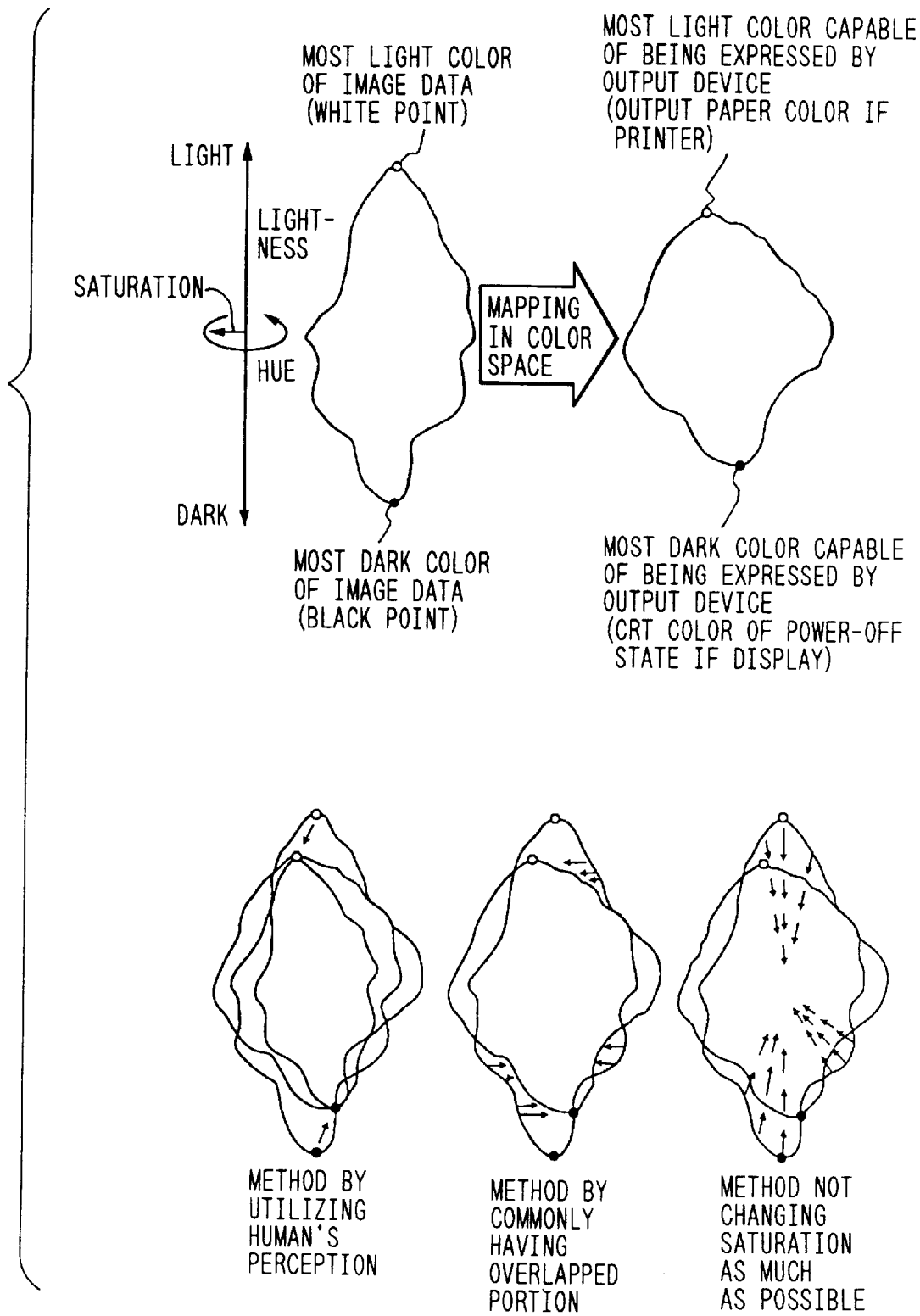
FIG. 37 shows an example of the notion of CMM.

FIG. 37 shows an example of a color gamut compression process.

A color gamut compression method is the one for mapping image data to colors expressible on an output device and is usually called CMM (color matching method).

Three typical examples of CMM will be taken up herein.

A first CMM is a method which utilizes human's perception as shown at lower left of FIG. 37.

In the first CMM, the most light and dark colors of image data are matched to the light and dark colors of an output device, respectively, and other colors are converted in such a manner as to maintain their relation with the most light and dark colors.

A second CMM is a method which leaves the overlapped portion of image data and the color gamut of the output device intact and which maps a nonoverlapping portion onto the outer edge of the color gamut of a destination of conversion with lightness thereof being saved.

A third CMM is a method which compresses a nonoverlapping portion of image data and the color gamut of the output device with saturation thereof being saved.

That is, the first CMM has a feature of attaching importance to lightness, the second CMM has a feature of faithfully reproducing such a gamut that is faithfully reproducible, and the third CMM has a feature of maintaining tone of a whole image.

Thus, it is impossible to faithfully reproduce image data falling outside the color gamut of an output device. Hence, CMM having an appropriate feature is executed for reproducing an image as close to an original as possible.

It is therefore necessary to select CMM according to characteristics of input image data.

Specific characteristics of input image data include image pictures, CG images (character data, drawing commands) and the like.

That is, the abovementioned selection intends to execute an optimum CMM based on characteristics of image data.

In contrast to this, it is necessary to change the process of CMM according to user's applications.

In details, for example, the process of CMM should be different depending on whether the user wants color matching at a high accuracy or at a high speed.

Thus, first and second embodiments described in detail below have a plurality of CMMs corresponding to combinations of types and processes of CMM.

Figure 2:
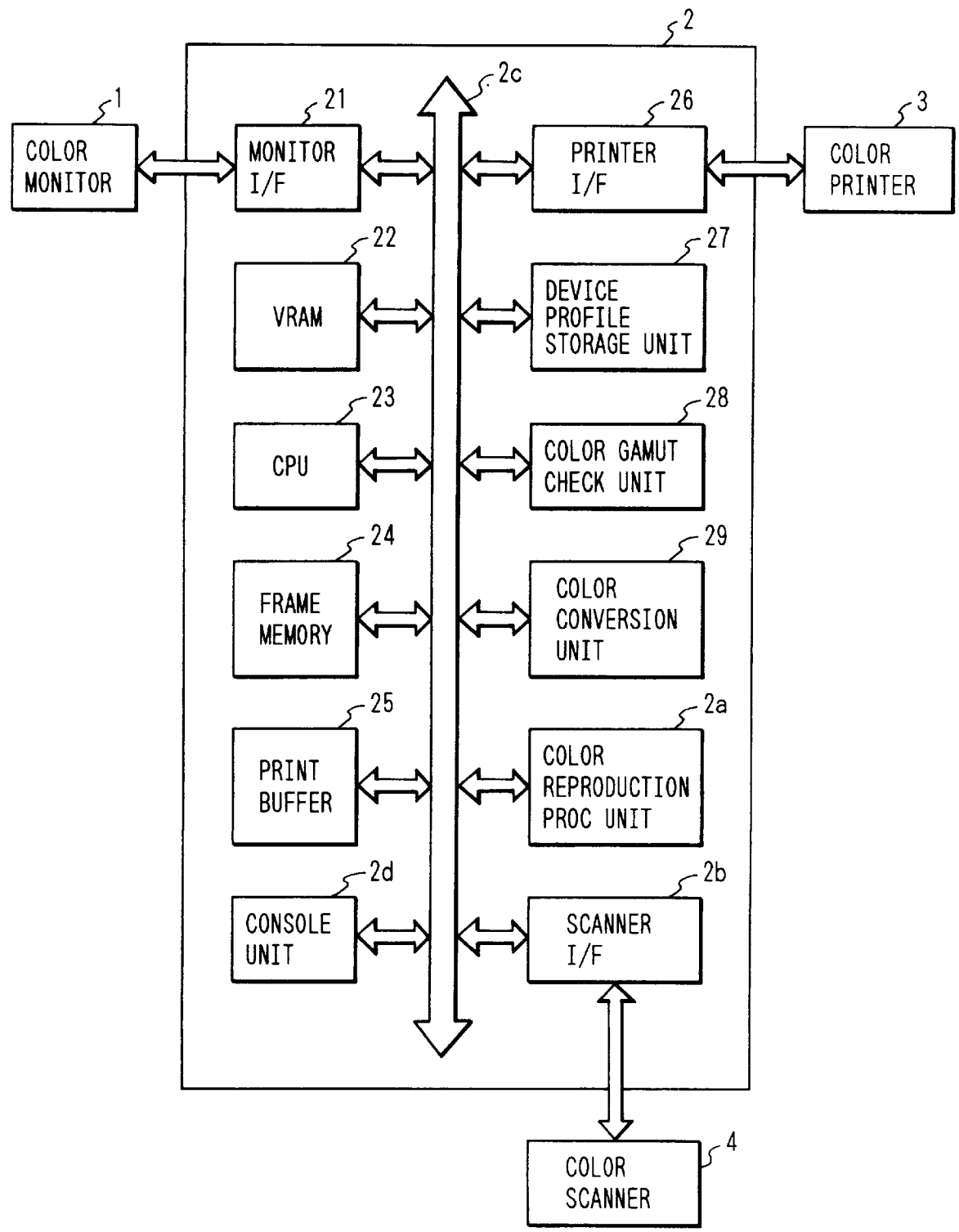
FIG. 2 is a block diagram showing the circuit configuration of an image processing system according to an embodiment of the present invention.

FIG. 2 is a block diagram showing the circuit configuration of an image processing system according to an embodiment of the present invention.

As shown in FIG. 2, the image processing system according to the present embodiment comprises a color monitor 1, a host computer 2, a color printer 3, and a color scanner 4.

The host computer 2 processes image data or the like read from the color scanner 4 and displays the results of processing on the color monitor 1 or prints on the color printer 3. In details, the host computer 2 has a monitor interface 21 for transmitting data to and from the color monitor 1, VRAM 22 used for display on the monitor, CPU 23 comprising ROM and RAM and controlling a whole system, a frame memory 24 used for display on the monitor, a print buffer 25 used for output to the printer, a printer interface 26 for transmitting data to and from the color printer 3, a device profile storage unit 27 for storing device profiles including color gamut information tables and other information, a color gamut check unit 28 for determining whether input color image data is present or not in the color gamut, a color conversion unit 29 for executing color space conversion associated with color reproduction, a color reproduction process unit 2a for executing a color reproduction process based on the results of determination at the color gamut check unit 28, a scanner interface 2b for transmitting data to and from the color scanner 4, a data bus 2c, and a console unit 2d used by the user for inputting instructions to the host computer by means of a mouse, keyboard or the like.

Figure 3:
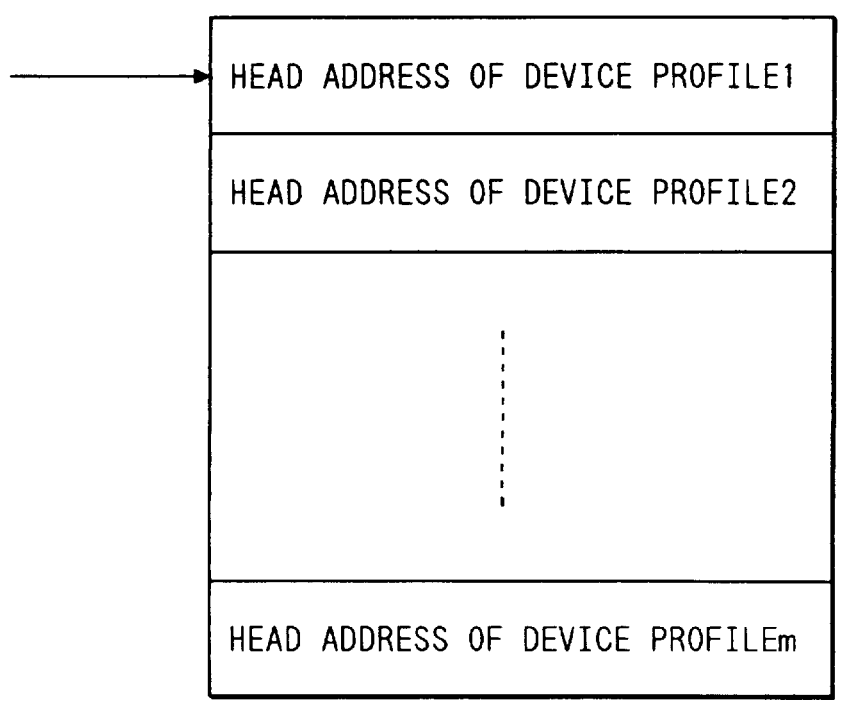
FIG. 3 shows a profile address table.

FIG. 3 shows an example of a profile address table stored in the device profile storage unit 27. m (constant) device profiles are stored.

The color space conversion process 2 in FIG. 1 will now be described in detail as an example of process.

FIG. 4 is a flow chart showing a process of outputting color image data (RGB brightness data) read from the color scanner 4 to the color printer 4 after executing a color matching process thereon.

At step S10, a set of color image data (RGB brightness data) is read out of the color image data read from the scanner 4, and then processing proceeds to step S11.

The abovementioned data is RGB data which depends on display characteristics of the color scanner 4, such as gamma characteristic and the like, and which is calorimetrically defined (a chromaticity value is definite for R, G, B and white).

The RGB data read at step S11 undergoes a color matching process at the color reproduction process unit 2a to be converted to CMYK data dependent on the color printer 3, and then processing proceeds to step S12.

The CMYK data converted at step S12 is stored in the print buffer 25, and then processing proceeds to step S13.

At step S13, it is checked whether remaining color image data is present.

If present, processing returns to step S10.

If absent, processing proceeds to step S14 to output the CMYK data stored in the print buffer to the color printer 3 and then terminates.

(First embodiment)

The present embodiment relates to an example of a process where information for use with a plurality of processes to realize one type of CMM is stored in corresponding independent device files, information for a selected process is fetched from a corresponding device profile, and the selected process is executed on color image data read from a scanner for color matching.

By storing information in independent device profiles, for example, when one piece of information is to be modified, the modification may be done in device profile units, thereby rendering the handling of data easy.

Figure 5:
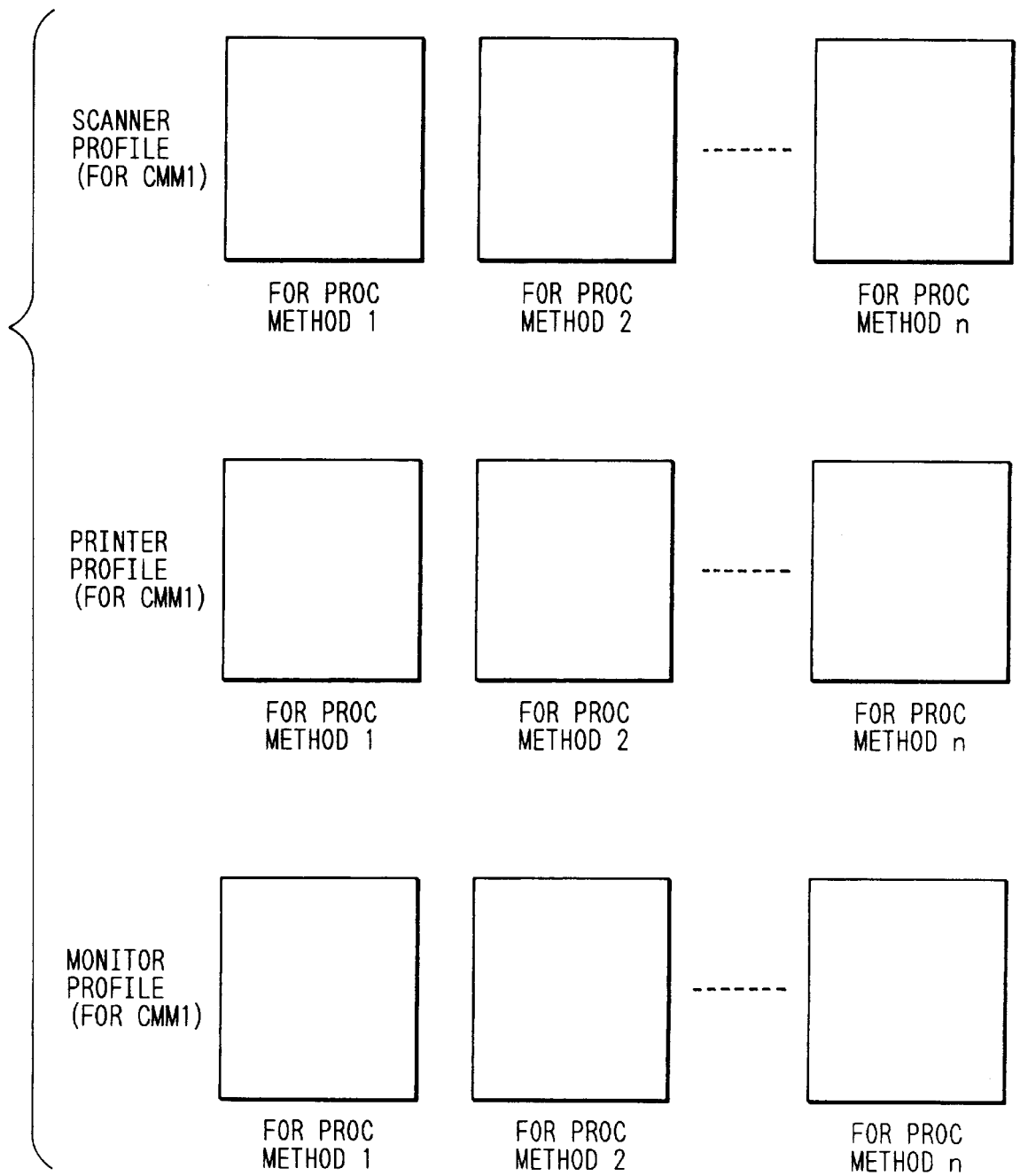
FIG. 5 exemplifies a case where when a plurality of color matching process methods are available, there exist a plurality of device profiles having information for the processes.

FIG. 5 shows that when there are n (n is a constant) process methods for realizing color matching called CMM1, the process methods featuring high accuracy, high speed and the like, respectively, device profiles number in up to n.

Figure 6:
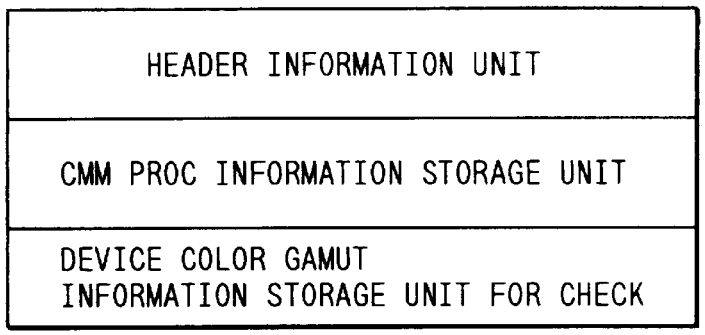
FIG. 6 shows an example of a profile structure.

FIG. 6 shows an example of the structure of a profile.

Here, the profile comprises the following three areas: a header information unit to store profile management information, a CMM process information storage unit to store information for a CMM process, and an information storage unit for device color gamut check for checking a device color gamut.

Figure 7:
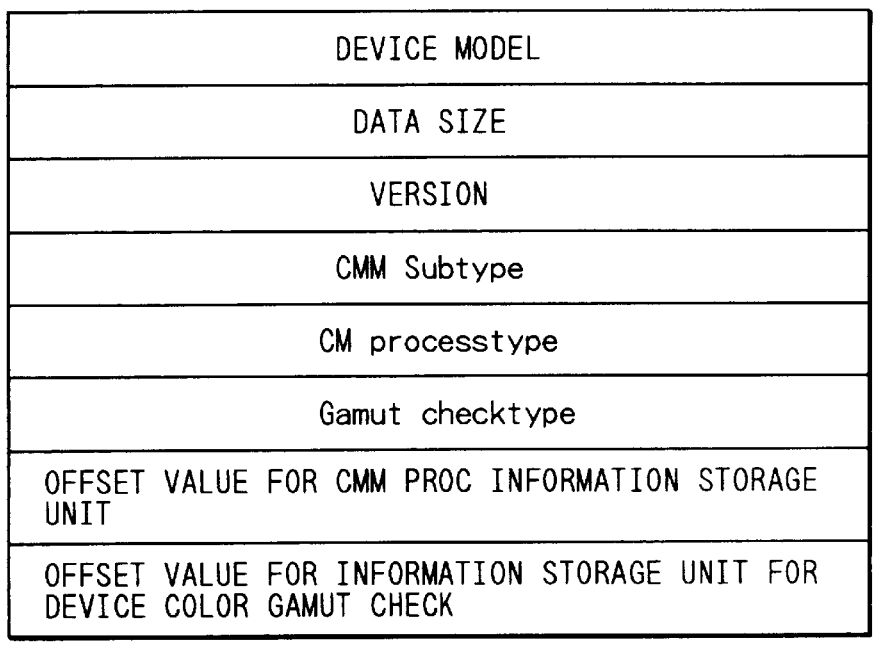
FIG. 7 shows an example of the structure of a header information unit.

FIG. 7 shows the structure of the header information unit.

Here, the header information unit stores a device model as information about an object device of a profile, a data size as data size information of a profile, a version for profile management, CMMSubtype as classification information of CMM, CMprocesstype as classification information of a process to realize a method of CMMSubtype, Gamutcheck-type as information indicating which device color gamut check method a profile corresponds to, information about an offset value for the CMM process information storage unit of FIG. 6, and information about an offset value for the information storage unit for device color gamut check of FIG. 6.

Figure 8:
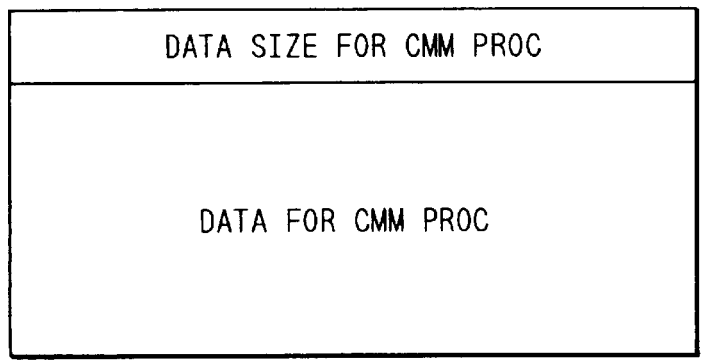
FIG. 8 shows an example of the structure of a CMM process information storage unit.
Figure 9:
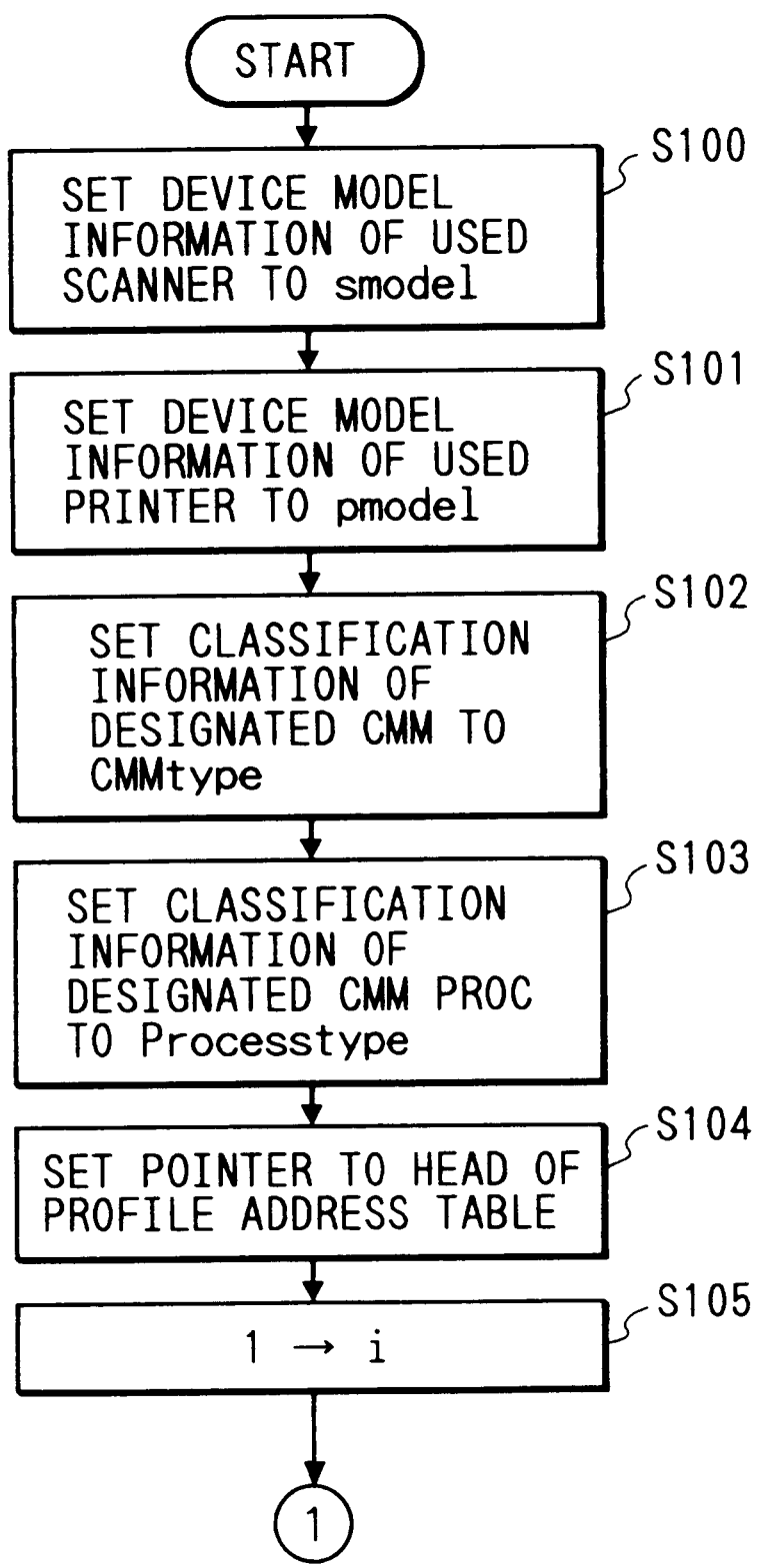
FIG. 9 is a flow chart showing a process of fetching information for a selected color matching process from a corresponding device profile shown in FIGS. 5 to 8 and executing the selected color matching process.
Figure 10:
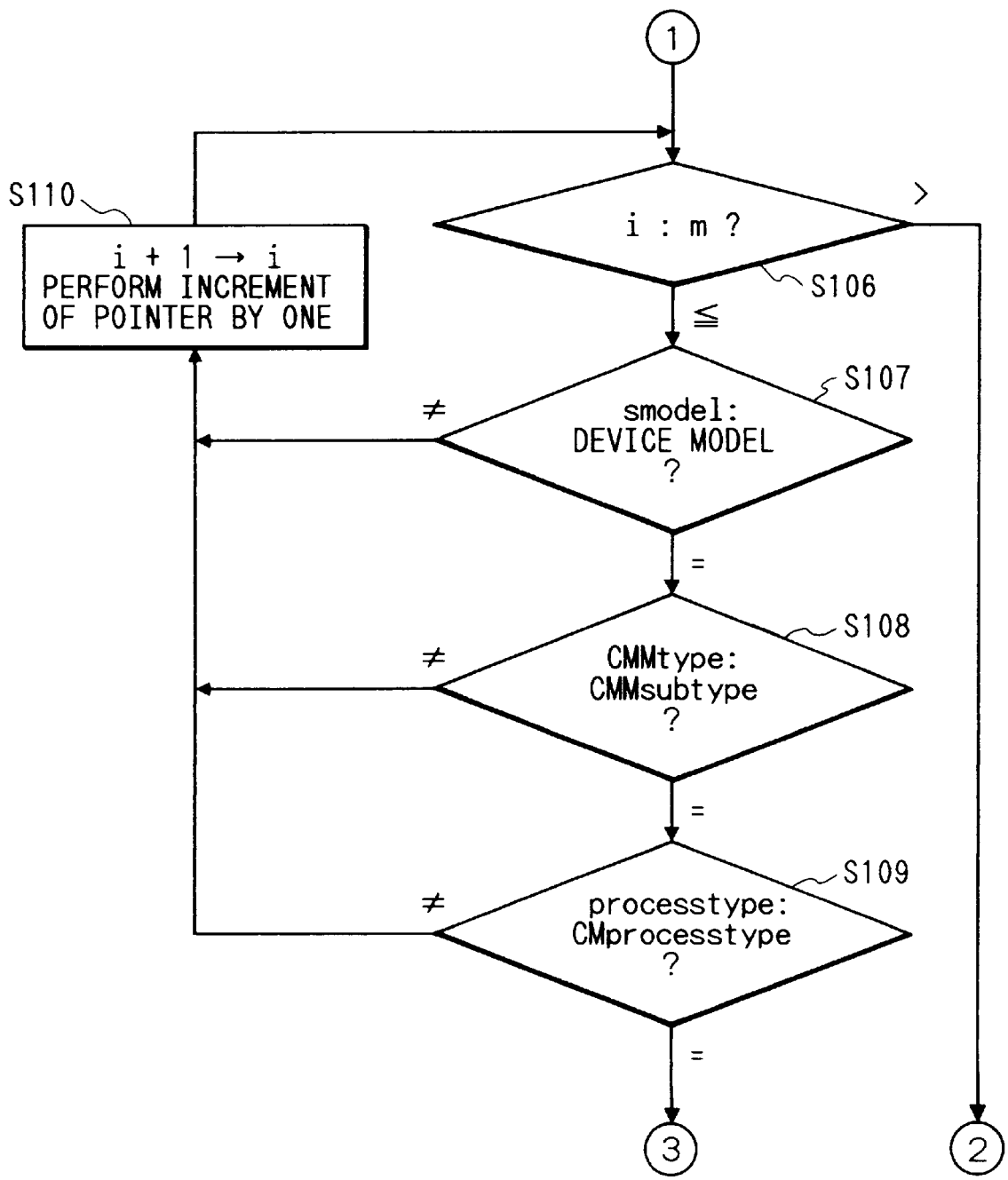
FIG. 10 is a flow chart showing a process of fetching information for a selected color matching process from a corresponding device profile shown in FIGS. 5 to 8 and executing the selected color matching process.

FIG. 8 shows the structure of the CMM process information storage unit of FIG. 6.

Here, the CMM process information storage unit stores a data size for a CMM process corresponding to a profile and data for the CMM process.

FIGS. 9 to 13 show flow charts illustrating a process at the color reproduction process unit 2a of fetching information for a selected color matching process from a corresponding device profile shown in FIGS. 5 to 8 and of executing a conversion process from the scanner color space to the printer color space, i.e. a color gamut compression process, the conversion process being described above as an example of a selected color matching process.

At step S100, the device model information of a scanner in use, which is a source device, is set for smodel. Then, processing proceeds to step S101.

At step S101, the device model information of a printer in use, which is a destination device, is set for pmodel. Then, processing proceeds to step S102.

At step S102, classification information of CMM designated from the console unit 2d is set for CMMtype. Then, processing proceeds to step S103.

Likewise, at step S103, classification information of a CMM process designated from the console unit 2d is set for processtype. Then, processing proceeds to step S104.

At step S104, a pointer is set to the head of the profile address table of FIG. 3. Then, processing proceeds to step S105.

At step S105, 1 is set for constant i. Then, processing proceeds to step S106.

At step S106, the value of i and the value of m (constant) indicative of the number of profiles are compared.

If i is greater than m, processing terminates.

If not, processing proceeds to step S107. Information about a device model which has been fetched from the header information unit based on the head address of a profile pointed by a pointer is compared with smodel.

If not equal, processing proceeds to step S110. i and the pointer are incremented by one, and then processing returns to step S106.

If equal at step S107, processing proceeds to step S108. CMMsubtype which has been fetched from the header information unit based on the head address of a profile pointed by a pointer is compared with CMMtype.

If not equal, processing proceeds to step S110. i and the pointer are incremented by one, and then processing returns to step S106.

If equal at step S108, processing proceeds to step S109. CMprocesstype which has been fetched from the header information unit based on the head address of a profile pointed by a pointer is compared with processtype.

If not equal, processing proceeds to step S110. i and the pointer are incremented by one, and then processing returns to step S106.

If equal at step S109, processing proceeds to step Sill. The head address of a profile is fetched, and the fetched head address is set for adr1. Then, processing proceeds to step S112.

At step S112, an offset value for the CMM process information storage unit is set for adr2. Then, processing proceeds to step S113.

At step S113, a pointer is set to adr1+adr2. Then, processing proceeds to step S114.

At step S114, a pointer is set to the head of data for CMM process in the CMM process information storage unit of FIG. 8. Then, processing proceeds to step S115.

At step S115, a CMM process is executed to correct scanner characteristics on the basis of data dependent on scanner characteristics using the data for CMM process pointed by the pointer. Then, processing proceeds to step S116.

At step S116, a pointer is set to the head of the profile address table of FIG. 3. Then, processing proceeds to step S117.

At step S117, 1 is set for constant i. Then, processing proceeds to step S118.

At step S118, the value of i and the value of m (constant) indicative of the number of profiles are compared.

If i is greater than m, processing terminates.

If not, processing proceeds to step S119. Information about a device model which has been fetched from the header information unit based on the head address of a profile pointed by a pointer is compared with pmodel.

If not equal, processing proceeds to step S122. i and the pointer are incremented by one, and then processing returns to step S118.

If equal at step S119, processing proceeds to step S120. CMMsubtype which has been fetched from the header information unit based on the head address of a profile pointed by a pointer is compared with CMMtype.

If not equal, processing proceeds to step S122. i and the pointer are incremented by one, and then processing returns to step S118.

If equal at step S120, processing proceeds to step S121. CMprocesstype which has been fetched from the header information unit based on the head address of a profile pointed by a pointer is compared with processtype.

If not equal, processing proceeds to step S112. i and the pointer are incremented by one, and then processing returns to step S118.

If equal at step S121, processing proceeds to step S123. The head address of a profile is fetched, and the fetched head address is set for adr1. Then, processing proceeds to step S124.

At step S124, an offset value for the CMM process information storage unit is set for adr2. Then, processing proceeds to step S125.

At step S125, a pointer is set to adr1+adr2. Then, processing proceeds to step S126.

At step S126, a pointer is set to the head of data for CMM process in the CMM process information storage unit of FIG. 8. Then, processing proceeds to step S127.

At step S127, a CMM process is executed for conversion to data dependent on printer characteristics using the data for CMM process pointed by the pointer. Then, processing terminates.

That is, according to the process described above, at steps S100 to S103, each piece of information is set for executing a CMM process designated by the user from the console unit 2c. At steps S104 to S115, for executing a designated CMM process at a designated scanner, a process dependent on designated scanner characteristics is executed using a source profile. Likewise, at steps S116 to S127, a process dependent on designated printer characteristics is executed using a destination profile.

Thus, when a certain type of CMM and a CMM process are designated, independent device profiles (scanner and printer profiles in this example) which have information corresponding to the designated method and process and which correspond to a source device and a destination device, respectively, are selected. Based on information contained in the device profiles, a color matching process can be executed.

(Second embodiment)

The present embodiment relates to a process where information about a plurality of processes for a certain type of CMM is stored in one device profile, information for a selected CMM process is fetched from the device profile, and the selected process is executed on color image data read from a scanner for color matching.

Since information about a plurality of processes is stored in one device profile, reading designated information or the like is easy to manage.

Figure 14:
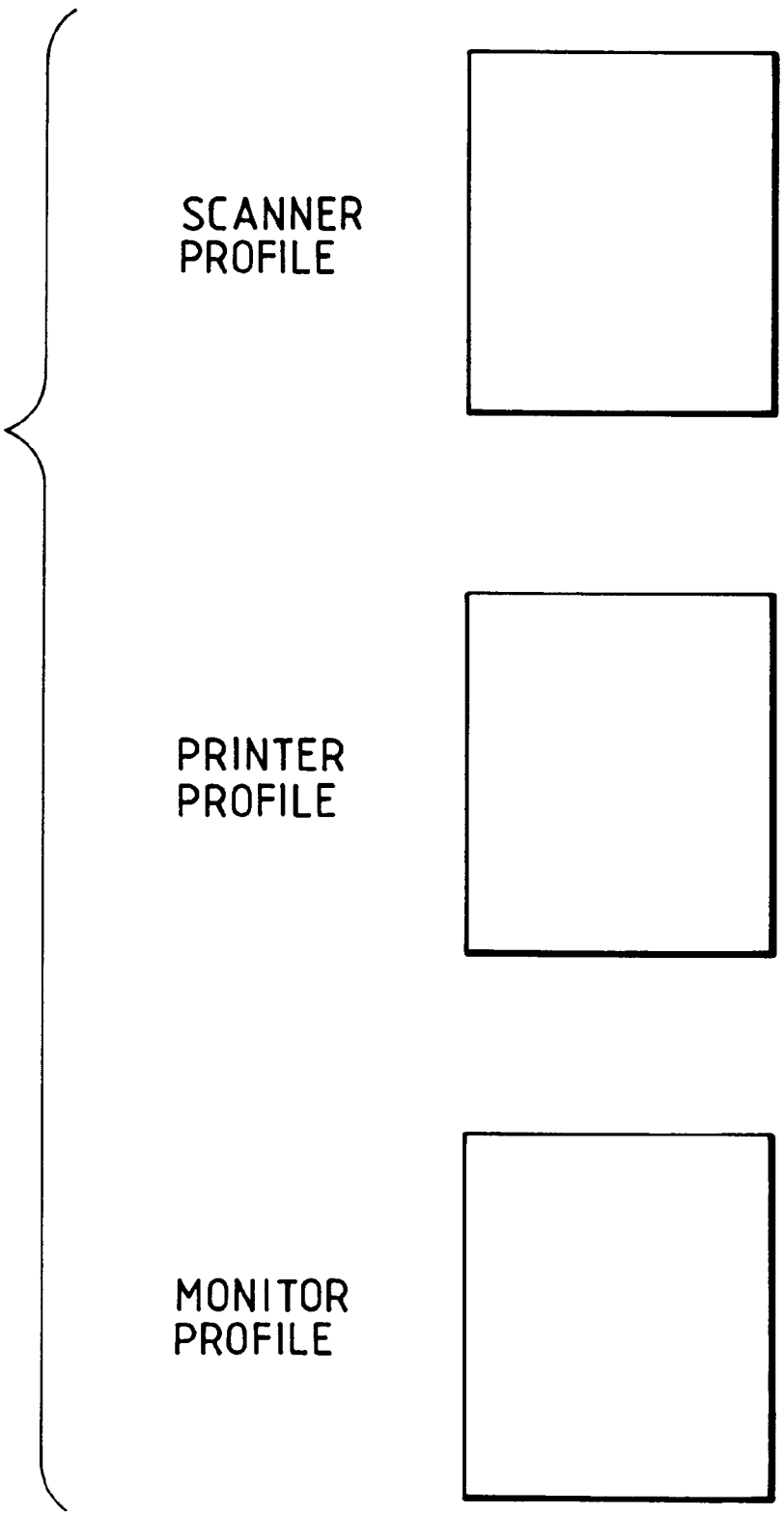
FIG. 14 exemplifies a case where when a plurality of color matching process methods are available, there exists one device profile having information for the processes.

FIG. 14 shows that even when there are n (n is a constant) process methods for realizing color matching called CMM1, only one device profile is involved.

An example of the structure of the profile described above is identical to the example in FIG. 6.

FIG. 15 shows the structure of the header information unit.

Here, the header information unit stores a device model as information about an object device of a profile, a data size as data size information of a profile, a version for profile management, Gamutchecktype as information indicating which device color gamut check method a profile corresponds to, information about an offset value for the CMM process information storage unit of FIG. 6, and information about an offset value for the information storage unit for device color gamut check of FIG. 6.

FIG. 16 shows the structure of the CMM process information storage unit of FIG. 6.

Here, the CMM process information storage unit comprises a header unit which manages data for 1 (constant) types of CMMs and a data storage unit for CMM which stores data for 1 (constant) types of CMMs.

Figure 17:
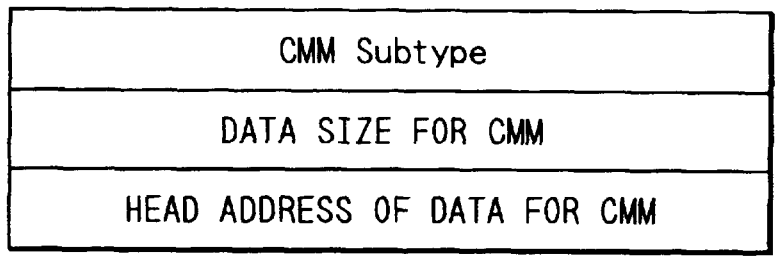
FIG. 17 shows an example of the structure of a data storage unit for CMM.

FIG. 17 shows the structure of the data storage unit for CMM of FIG. 16.

Here, the data storage unit for CMM stores CMMsubtype as classification information of CMM, information about data size for CMM, and the head address of data for CMM.

Figure 18:
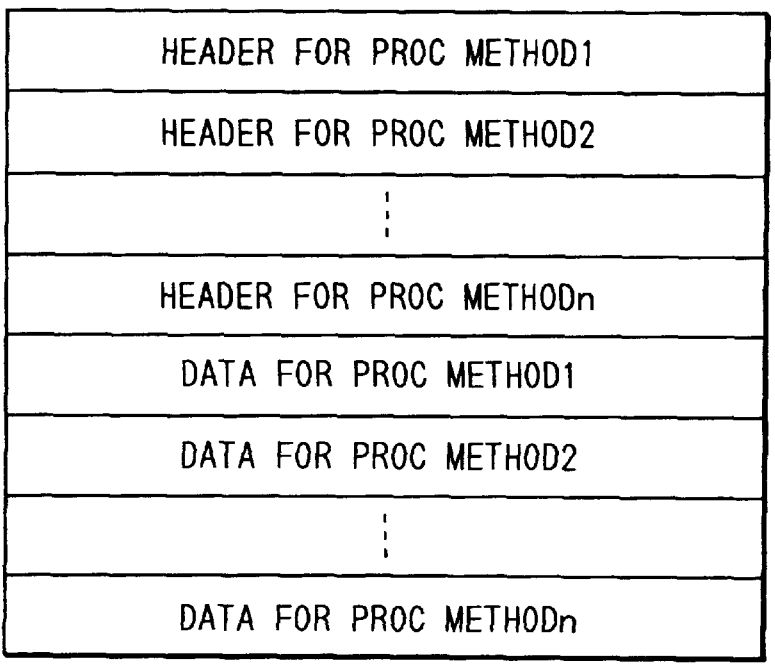
FIG. 18 shows an example of the structure of data for CMM.

FIG. 18 shows the structure of the data storage unit for CMM of FIG. 17.

Here, the data storage unit for CMM comprises a header unit which manages data for n (constant) process methods for CMM and a data storage unit for process methods which stores data for n (constant) process methods for CMM.

Figure 19:
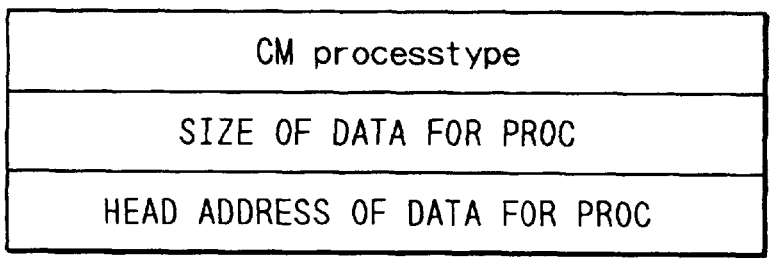
FIG. 19 shows an example of the structure of data for a process method.
Figure 20:
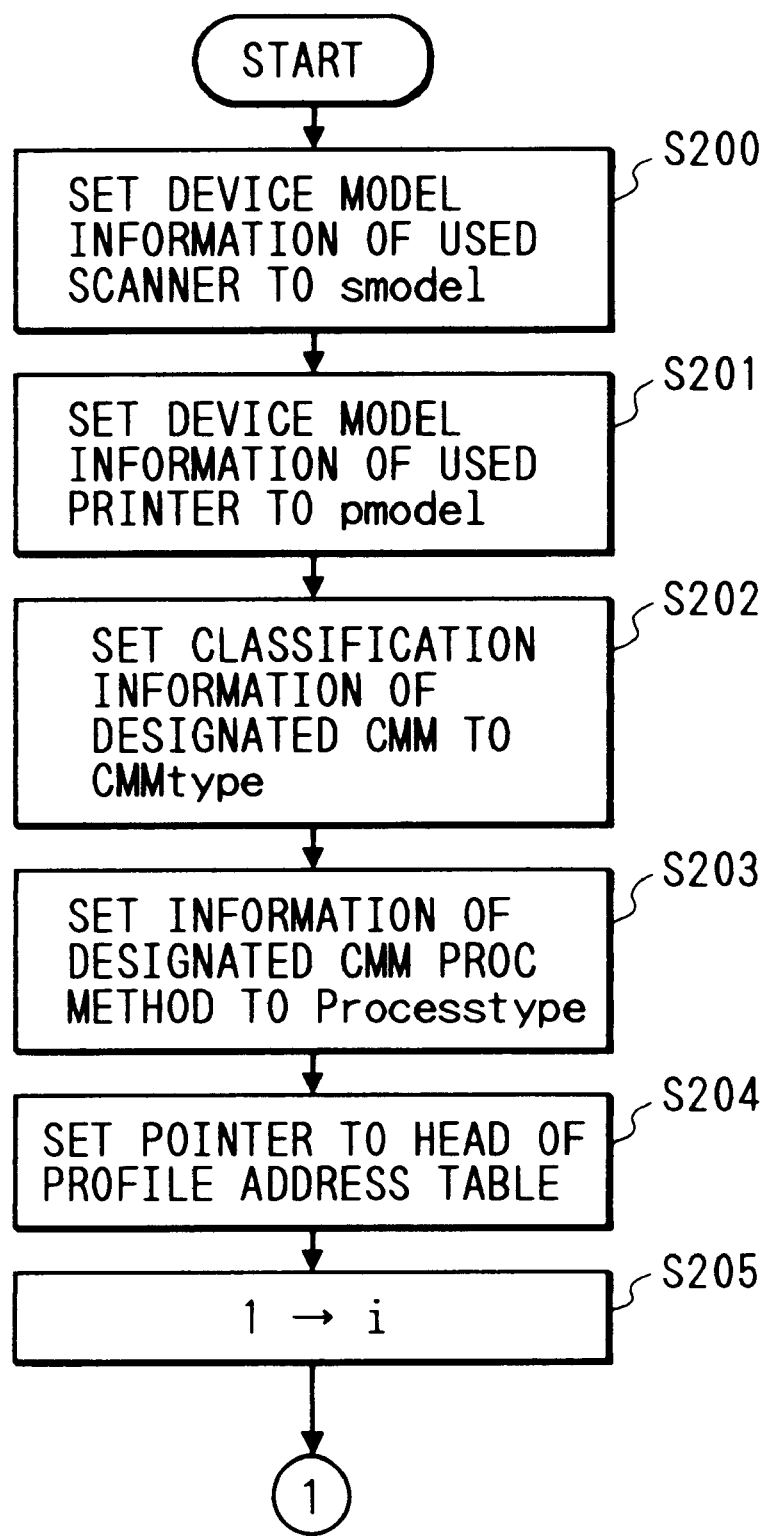
FIG. 20 is a flow chart showing a process of fetching information for a selected color matching process from a corresponding device profile shown in FIGS. 14 to 19 and executing the selected color matching process.
Figure 21:
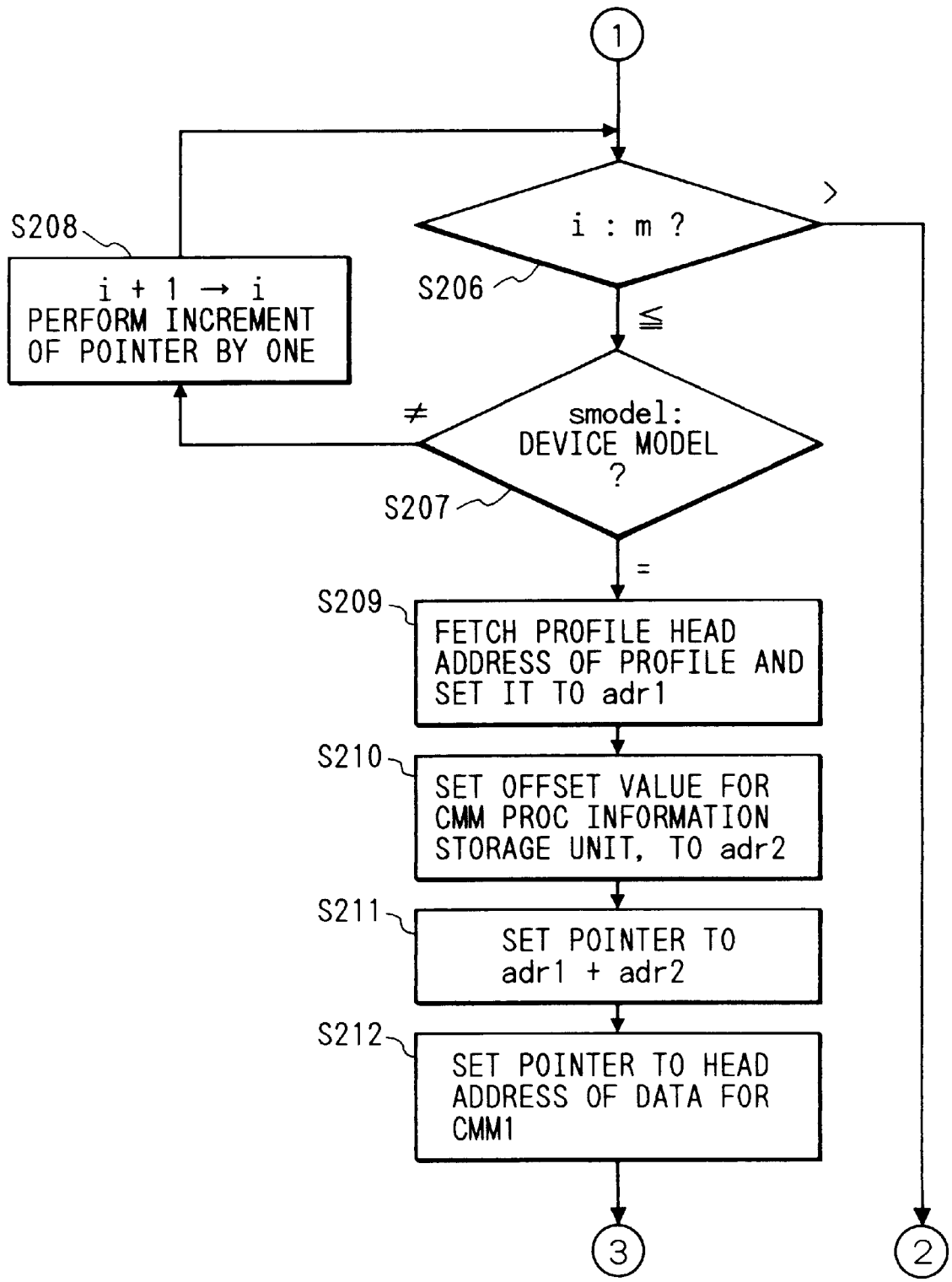
FIG. 21 is a flow chart showing a process of fetching information for a selected color matching process from a corresponding device profile shown in FIGS. 14 to 19 and executing the selected color matching process.
Figure 22:
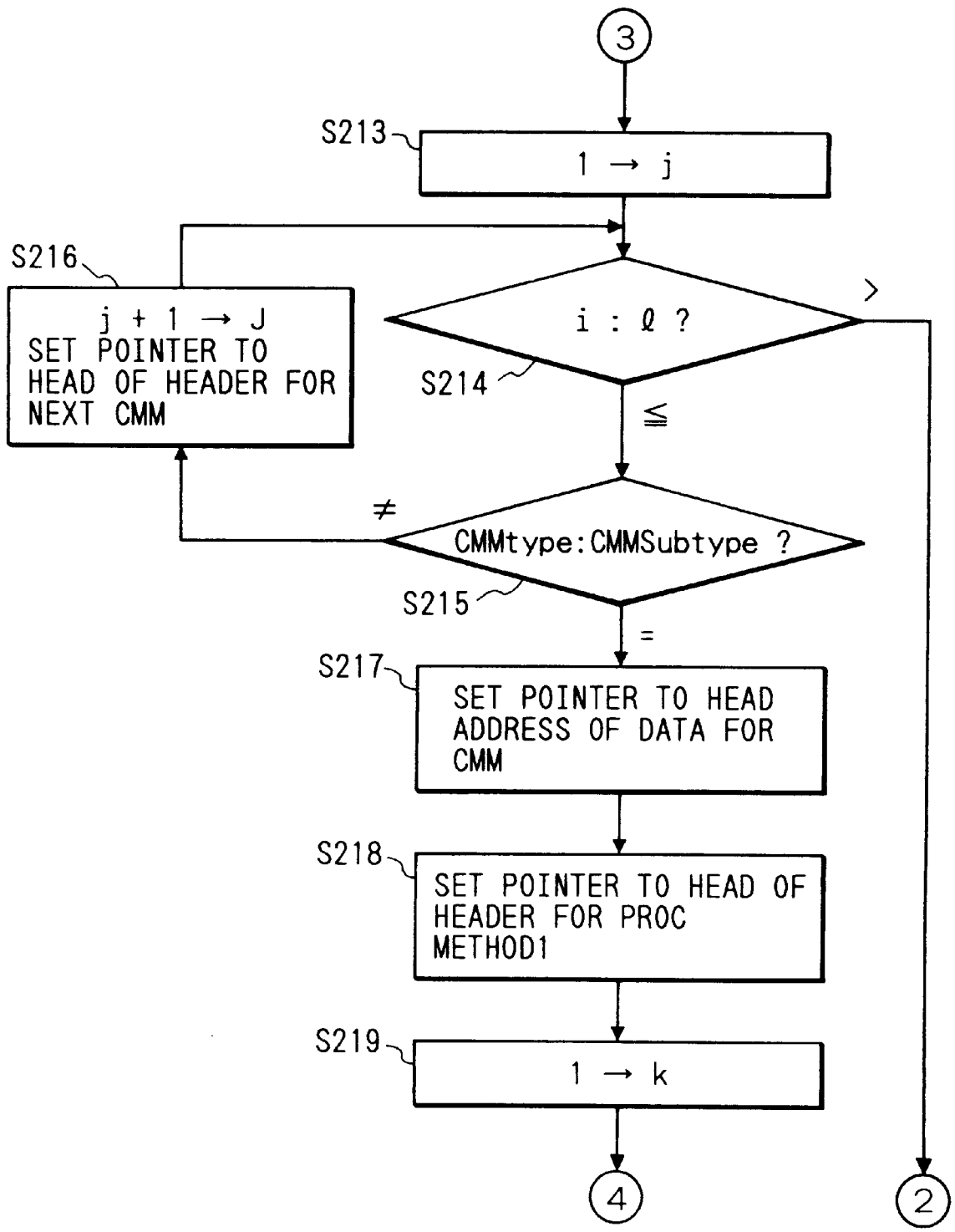
FIG. 22 is a flow chart showing a process of fetching information for a selected color matching process from a corresponding device profile shown in FIGS. 14 to 19 and executing the selected color matching process.

FIG. 19 shows the structure of the data storage unit for process methods of FIG. 18.

Here, the data storage unit for process methods stores CMprocesstype as classification information of a CMM process, information about the size of data for a CMM process, and the head address of data for a CMM process.

FIGS. 20 to 26 show flow charts illustrating a process at the color reproduction process unit 2a of fetching information for a selected color matching process from a corresponding device profile shown in FIGS. 14 to 19 and of executing a conversion process from the scanner color space to the printer color space, the conversion process being described above as an example of a selected color matching process.

At step S200, the device model information of a scanner in use is set for smodel. Then, processing proceeds to step S201.

At step S201, the device model information of a printer in use is set for pmodel. Then, processing proceeds to step S202.

At step S202, classification information of CMM designated from the console unit 2d is set for CMMtype. Then, processing proceeds to step S203.

Likewise, at step S203, classification information of a CMM process designated from the console unit 2d is set for Processtype. Then, processing proceeds to step S204.

At step S204, a pointer is set to the head of the profile address table of FIG. 3. Then, processing proceeds to step S205.

At step S205, 1 is set for constant i. Then, processing proceeds to step S206.

At step S206, the value of i and the value of m (constant) indicative of the number of profiles are compared.

If i is greater than m, processing terminates.

If not, processing proceeds to step S207. Information about a device model which has been fetched from the header information unit based on the head address of a profile pointed by a pointer is compared with smodel.

If not equal, processing proceeds to step S208. i and the pointer are incremented by one, and then processing returns to step S206.

If equal at step S207, processing proceeds to step S209. The head address of a profile is fetched, and the fetched head address is set for adr1. Then, processing proceeds to step S210.

At step S210, an offset value for the CMM process information storage unit is set for adr2. Then, processing proceeds to step S211.

At step S211, a pointer is set to adr1+adr2. Then, processing proceeds to step S212.

At step S212, a pointer is set to the head of a header for CMM1 in the CMM process information storage unit of FIG. 16. Then, processing proceeds to step S213.

At step S213, 1 is set for constant j. Then, processing proceeds to step S214.

At step S214, the value of j and the corresponding value of 1 (constant) indicative of the number of CMMs are compared.

If j is greater than 1, processing terminates.

If not, processing proceeds to step S215. CMMsubtype which has been fetched from the header information unit based on the head address of a profile pointed by a pointer is compared with CMMtype.

If not equal, processing proceeds to step S216. j is incremented by one, and the pointer is set to the head of a header for a next CMM. Then, processing returns to step S214.

If equal at step S215, processing proceeds to step S217. A pointer is set to the head address of data for CMM of FIG. 17, and then processing proceeds to step S218.

At step S218, a pointer is set to the head of a header for process method1 of FIG. 18. Then, processing proceeds to step S219.

At step S219, 1 is set for constant k. Then, processing proceeds to step S220.

At step S220, the value of k and the corresponding value of n (constant) indicative of the number of CMM processes are compared.

If k is greater than n, processing terminates.

If not, processing proceeds to step S221. CMprocesstype which has been fetched from the header information unit based on the head address of a profile pointed by a pointer is compared with Processtype.

If not equal, processing proceeds to step S222. k is incremented by one, and the pointer is set to the head of a header for a next process method. Then, processing returns to step S220.

If equal at step S221, processing proceeds to step S223. A pointer is set to the head address of data for process of FIG. 19. Then, processing proceeds to step S224.

At step S224, a CMM process is executed to correct scanner characteristics on the basis of data indicative of scanner characteristics using data for process pointed by the pointer. Then, processing proceeds to step S225.

At step S225, a pointer is set to the head of the profile address table of FIG. 3. Then, processing proceeds to step S226.

At step S226, 1 is set for constant i. Then, processing proceeds to step S227.

At step S227, the value of i and the value of m (constant) indicative of the number of profiles are compared.

If i is greater than m, processing terminates.

If not, processing proceeds to step S228. Information about a device model which has been fetched from the header information unit based on the head address of a profile pointed by a pointer is compared with pmodel.

If not equal, processing proceeds to step S229. i and the pointer are incremented by one, and then processing returns to step S227.

If equal at step S228, processing proceeds to step S230. The head address of a profile is fetched, and the fetched head address is set for adr1. Then, processing proceeds to step S231.

At step S231, an offset value for the CMM process information storage unit is set for adr2. Then, processing proceeds to step S232.

At step S232, a pointer is set to adr1+adr2. Then, processing proceeds to step S233.

At step S233, a pointer is set to the head of a header for CMM1 in the CMM process information storage unit of FIG. 16. Then, processing proceeds to step S234.

At step S234, 1 is set for constant j. Then, processing proceeds to step S235.

At step S235, the value of j and the corresponding value of 1 (constant) indicative of the number of CMMs are compared.

If j is greater than 1, processing terminates.

If not, processing proceeds to step S236. CMMsubtype which has been fetched from the header information unit based on the head address of a profile pointed by a pointer is compared with CMMtype.

If not equal, processing proceeds to step S237. j is incremented by one, and the pointer is set to the head of a header for a next CMM. Then, processing returns to step S235.

If equal at step S236, processing proceeds to step S238. A pointer is set to the head address of data for CMM of FIG. 17, and then processing proceeds to step S239.

At step S239, a pointer is set to the head of a header for process method1 of FIG. 19. Then, processing proceeds to step S240.

At step S240, 1 is set for constant k. Then, processing proceeds to step S241.

At step S241, the value of k and the corresponding value of n (constant) indicative of the number of CMM processes are compared.

If k is greater than n, processing terminates.

If not, processing proceeds to step S242. CMprocesstype which has been fetched from the header information unit based on the head address of a profile pointed by a pointer is compared with Processtype.

If not equal, processing proceeds to step S243. k is incremented by one, and the pointer is set to the head of a header for a next process method. Then, processing returns to step S241.

If equal at step S242, processing proceeds to step S244. A pointer is set to the head address of data for process of FIG. 19. Then, processing proceeds to step S245.

At step S245, a CMM process is executed to make conversion to data dependent on printer characteristics using data for process pointed by the pointer. Then, processing terminates.

That is, as in the first embodiment, according to the process described above, at steps S200 to S203, each piece of information is set for executing CMM designated by the user from the console unit 2c. At steps S204 to S224, a scanner related process is executed, and at steps S225 to S245, a printer related process is executed.

Thus, when a certain type of CMM and a CMM process are designated, information for the designated type of CMM and process is fetched from device profiles associated with devices concerned (scanner and printer profiles in this example). Based on the information, a color matching process can be executed.

Figure 11:
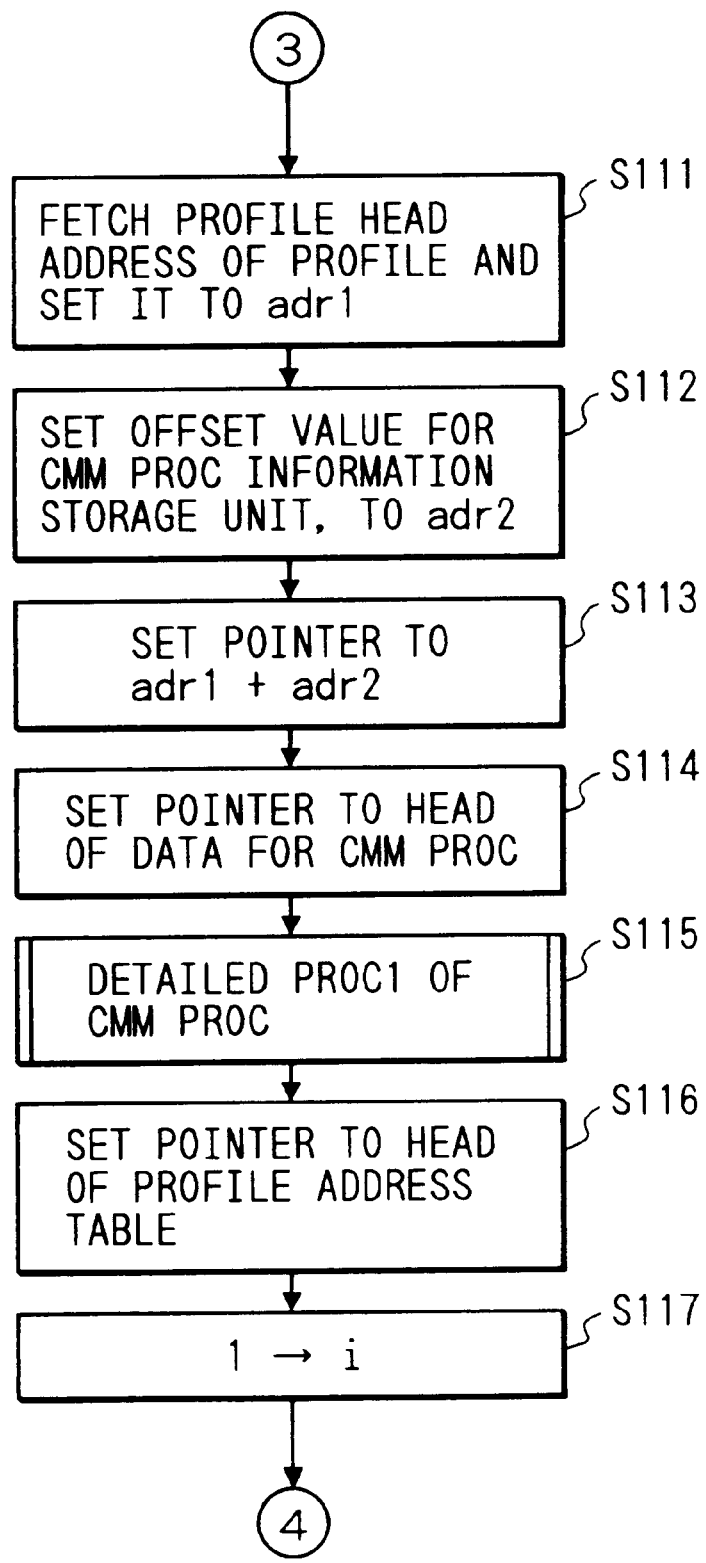
FIG. 11 is a flow chart showing a process of fetching information for a selected color matching process from a corresponding device profile shown in FIGS. 5 to 8 and executing the selected color matching process.
Figure 12:
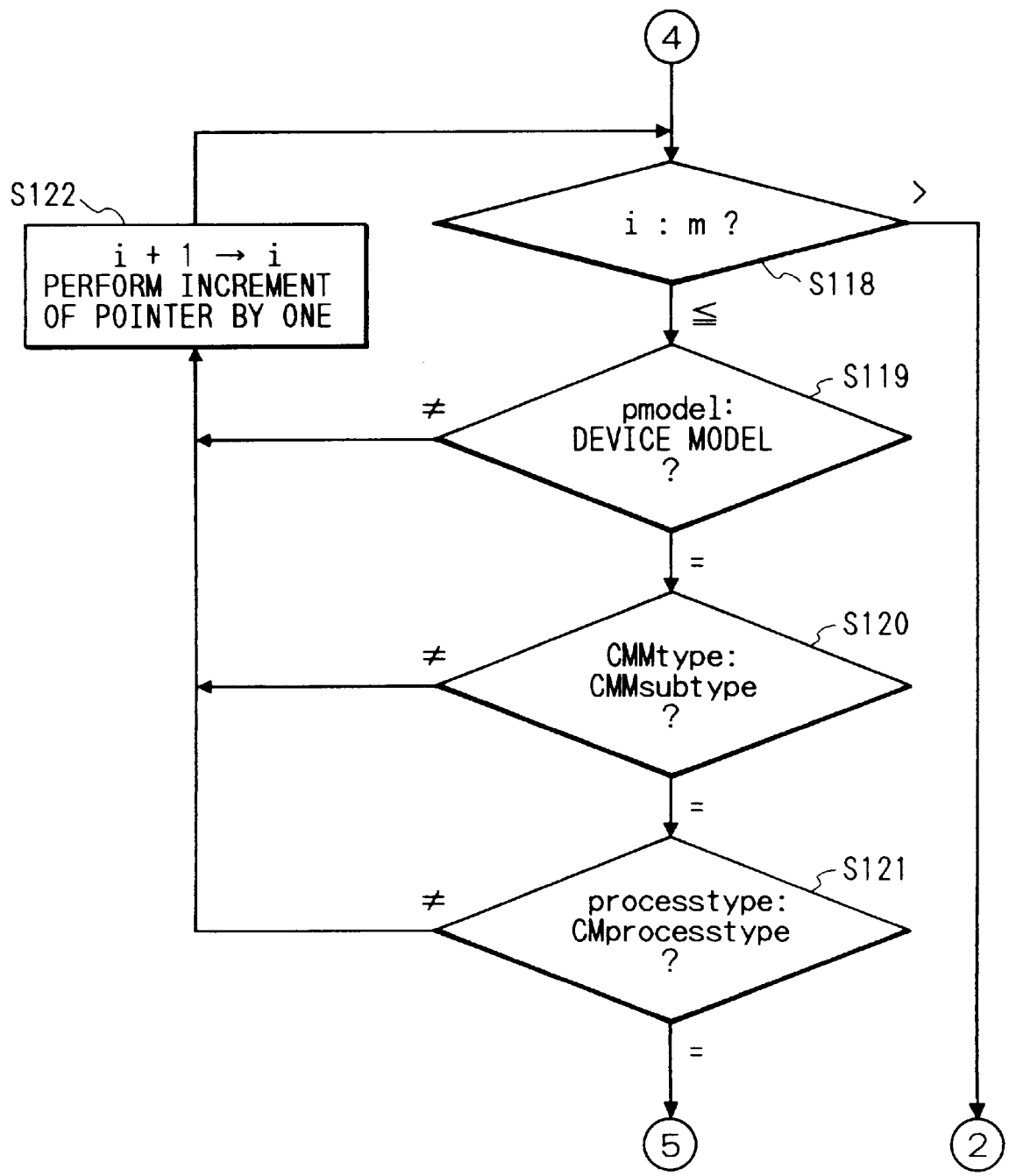
FIG. 12 is a flow chart showing a process of fetching information for a selected color matching process from a corresponding device profile shown in FIGS. 5 to 8 and executing the selected color matching process.
Figure 13:
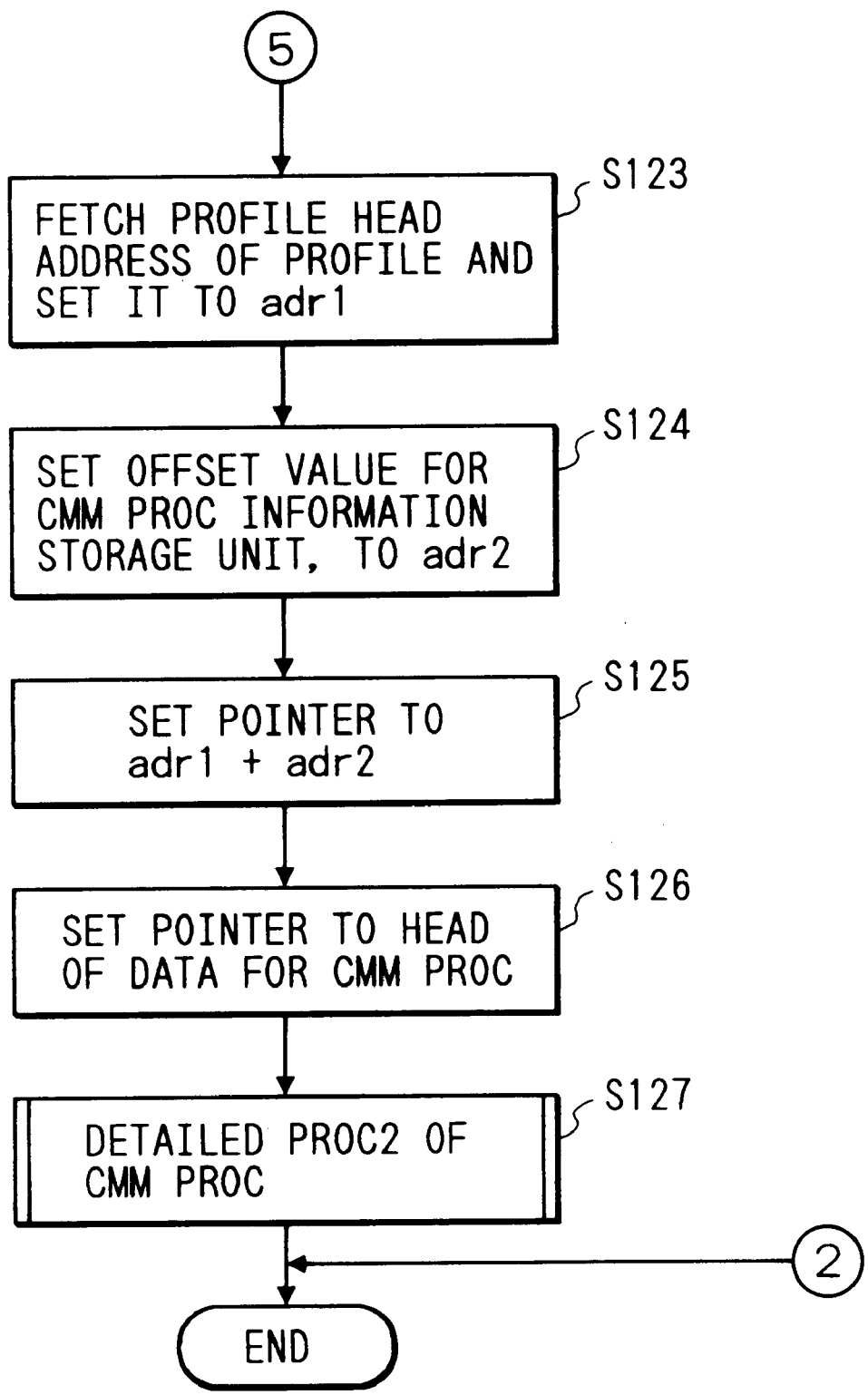
FIG. 13 is a flow chart showing a process of fetching information for a selected color matching process from a corresponding device profile shown in FIGS. 5 to 8 and executing the selected color matching process.
Figure 23:
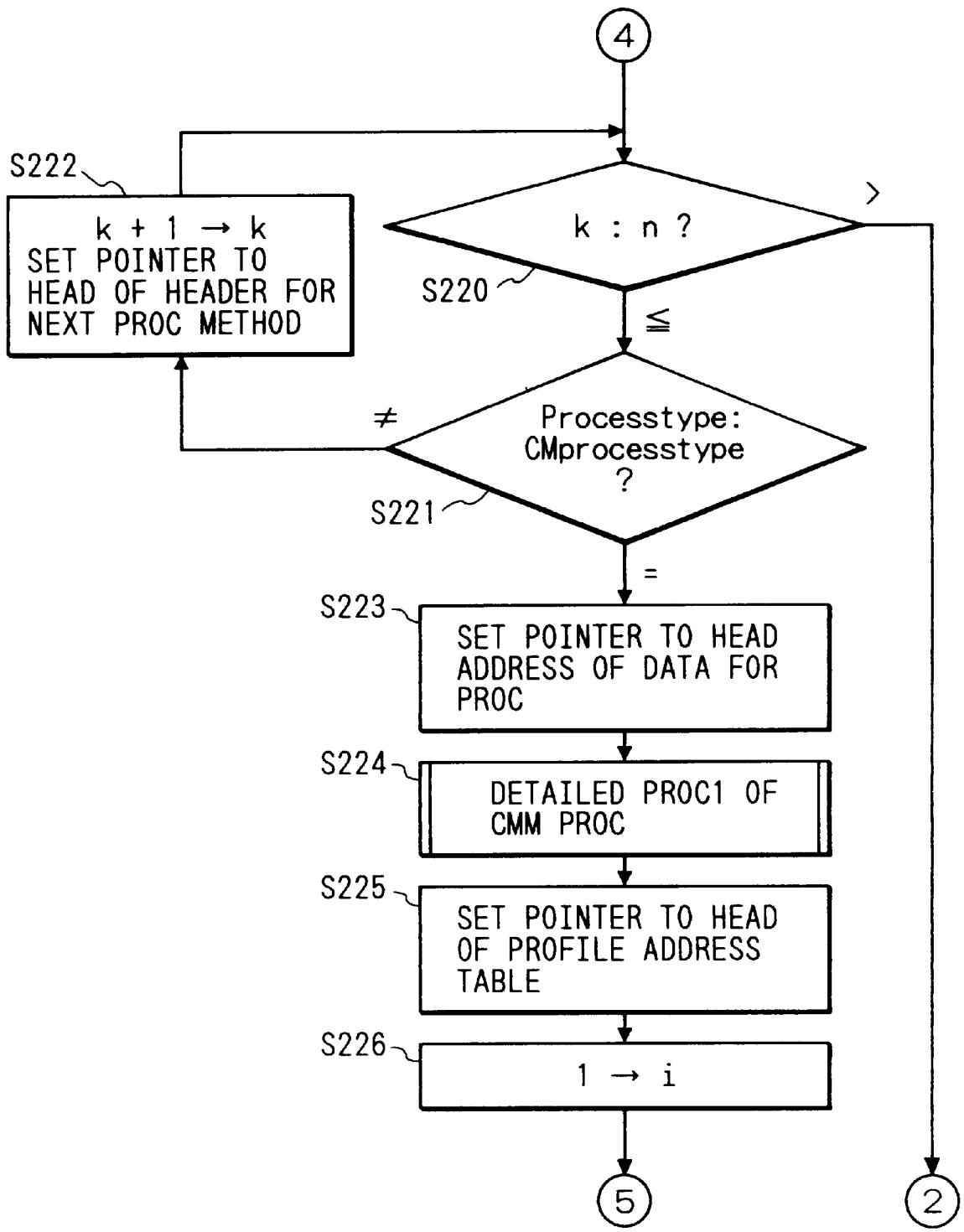
FIG. 23 is a flow chart showing a process of fetching information for a selected color matching process from a corresponding device profile shown in FIGS. 14 to 19 and executing the selected color matching process.
Figure 24:
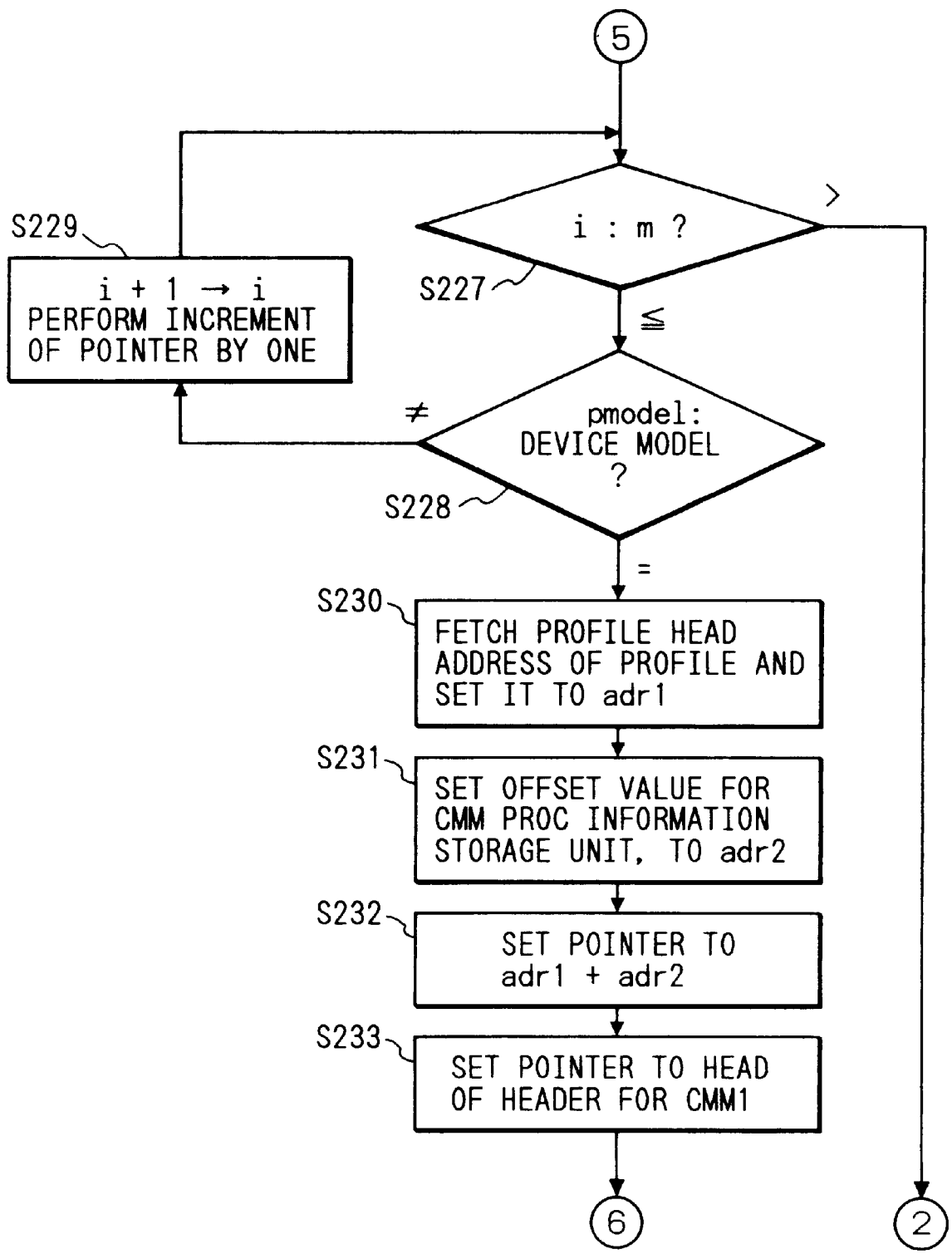
FIG. 24 is a flow chart showing a process of fetching information for a selected color matching process from a corresponding device profile shown in FIGS. 14 to 19 and executing the selected color matching process.
Figure 25:
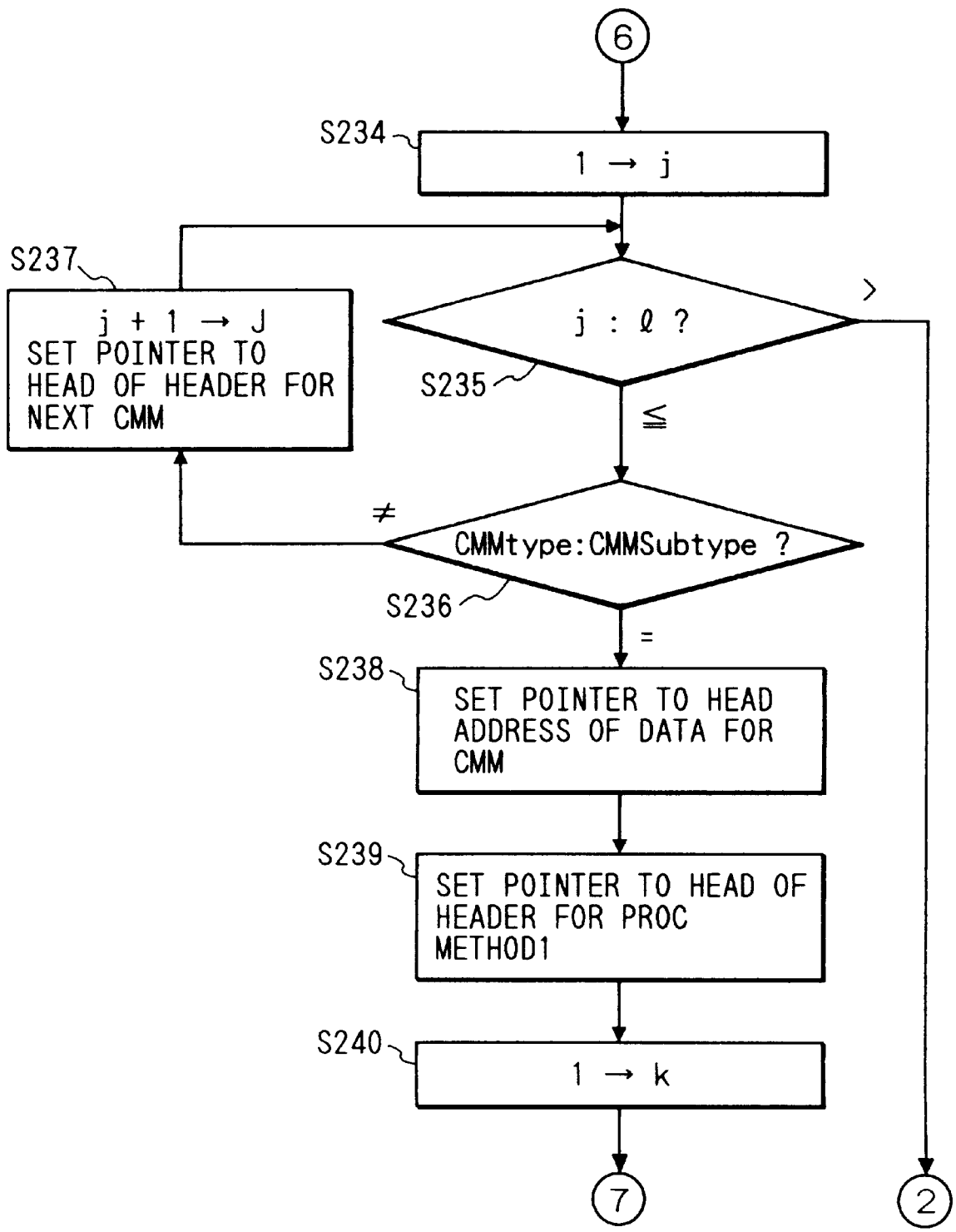
FIG. 25 is a flow chart showing a process of fetching information for a selected color matching process from a corresponding device profile shown in FIGS. 14 to 19 and executing the selected color matching process.
Figure 26:
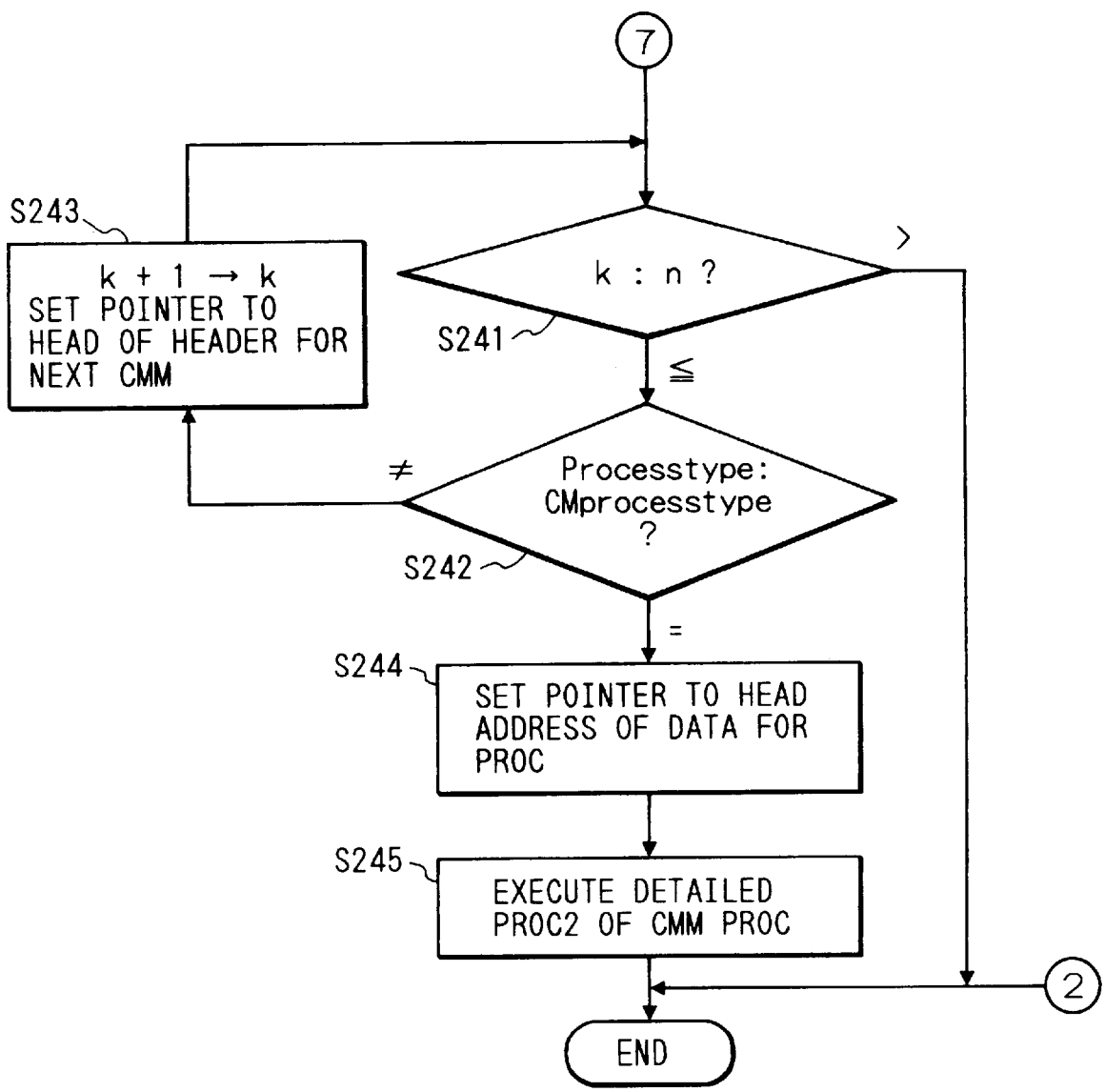
FIG. 26 is a flow chart showing a process of fetching information for a selected color matching process from a corresponding device profile shown in FIGS. 14 to 19 and executing the selected color matching process.

Processes of step S115 of FIG. 11, step S127 of FIG. 13, step S224 of FIG. 23, and step S245 of FIG. 26 are designated ones out of a plurality of processes to realize a designated type of CMM.

As described above, according to the first and second embodiments, it is possible to execute a color matching process according to characteristics of input image data and user's applications.

As in the case of CMM, information used for a gamut check, which determines whether input image data falls in the color gamut of an output device, may be made selectable according to applications and functions.

That is, the correspondence of a gamut type in a header of a profile and information corresponding to the gamut type with speed or accuracy may be established.

An example of a process where color matching is rather lower in accuracy, but shorter in processing time, and an example of a process where color matching is higher in accuracy, but longer in processing time, will be given as examples of color matching processes corresponding to combinations of CMMSubtype and CMprocesstype in the first and second embodiments described above.

(Example of a process where color matching is rather lower in accuracy, but shorter in processing time)

Figure 27:
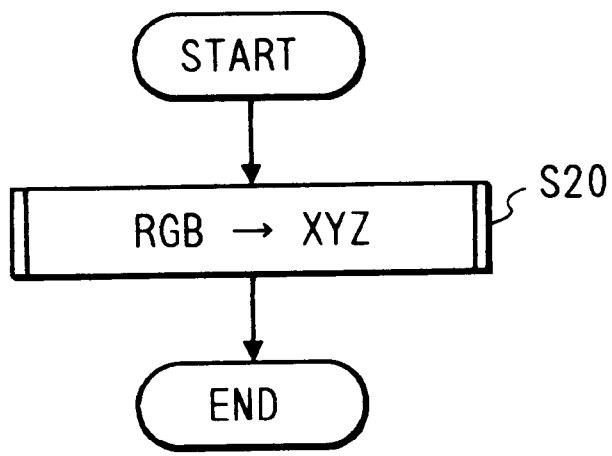
FIG. 27 shows an example of the process of step S115 of FIG. 11 or of step S224 of FIG. 23.

FIG. 27 shows an example of the process of step S115 of FIG. 11 or step S224 of FIG. 23, i.e. an example of a process of converting input data dependent on characteristics of a source device to standard data.

Here, scanner dependent RGB brightness data is converted to device independent XYZ data provided for by CIE (International Commission on Illumination).

Since the scanner dependent RGB data is the one defined calorimetrically (a chromaticity value is definite for R, G, B and white), the relational expression of FIG. 29 holds between the RGB data and XYZ data. The relational expression of FIG. 29 can be used for the process of step S115 of FIG. 11.

Where, $P_{ij}$ (i, j=1, 2, 3) indicates constants determined respectively by calorimetric definitions of RGB dependent on the scanner 4. The constant can be used as data for CMM process of step S114 of FIG. 11 or step S223 of FIG. 23.

Figure 28:
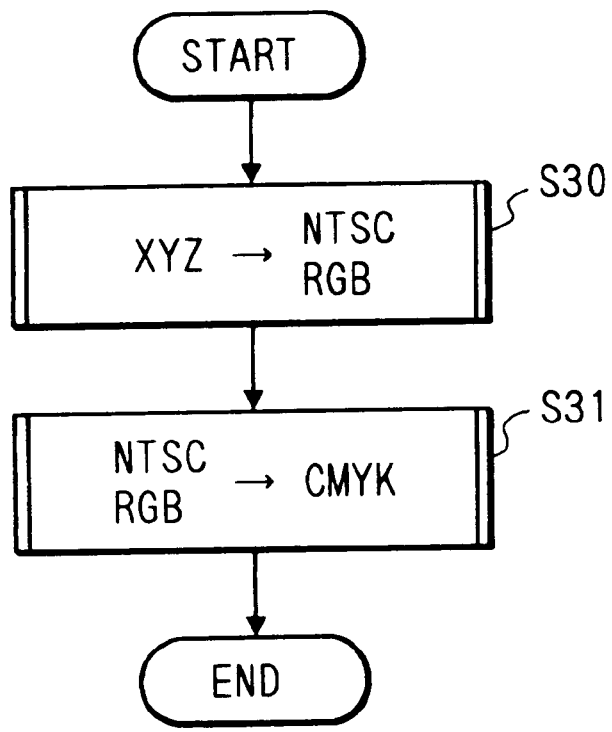
FIG. 28 shows an example of the process of step S127 of FIG. 13 or of step S245 of FIG. 26.

FIG. 28 shows an example of the process of step S127 of FIG. 13 or step S245 of FIG. 26, i.e. an example of a process of converting the standard data to data dependent on output characteristics of a destination device.

At step S30, the XYZ data converted at step S20 of FIG. 27 is converted to RGB data conforming to NTSC (National Television System Committee). Then, processing proceeds to step S31.

At step S31, the above RGB data conforming to NTSC is converted to printer dependent CMYK data. Then, processing terminates.

Since the RGB data conforming to NTSC is the one defined calorimetrically (a chromaticity value is definite for R, G, B and white), the relational expression of FIG. 30 holds between the RGB data and XYZ data. The relational expression of FIG. 30 can be used for the process of step S30 of FIG. 28.

Where, $q_{ij}$ (i, j=1, 2, 3) indicates constants determined respectively by calorimetric definitions of RGB conforming to NTSC.

Figure 31:
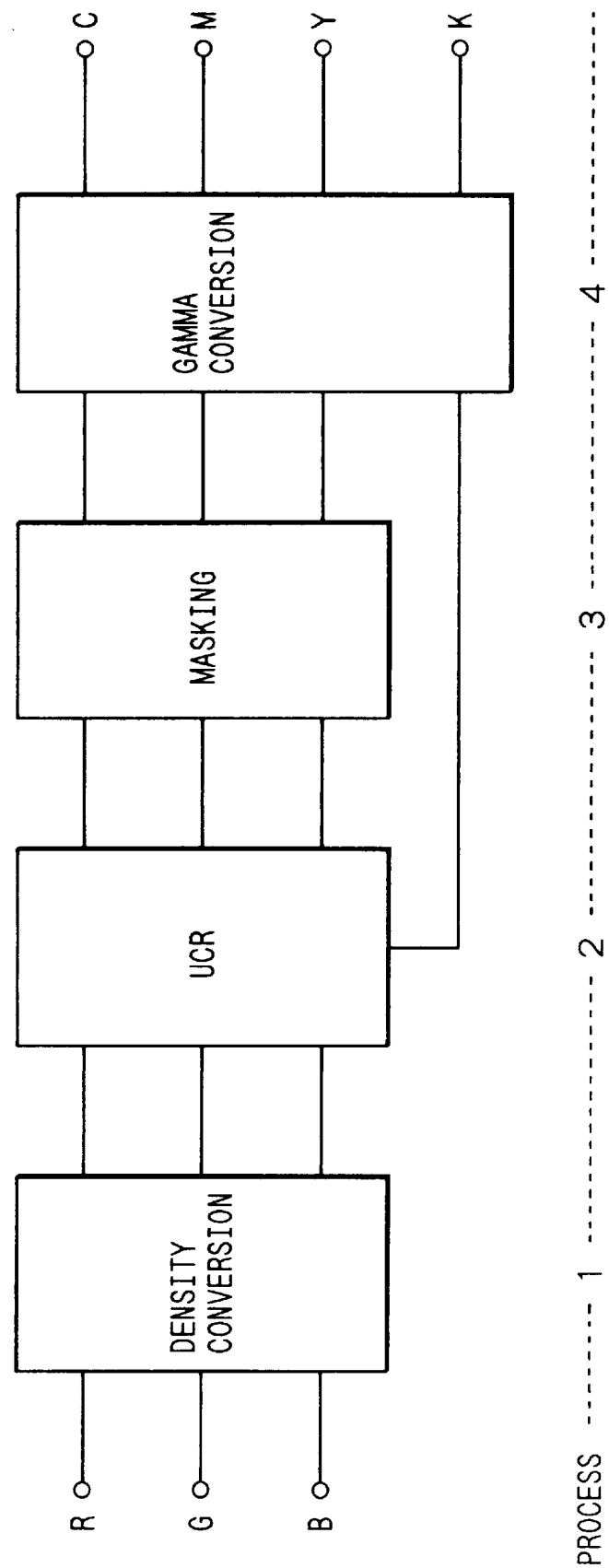
FIG. 31 shows an example of the process of step S31 of FIG. 28.

FIG. 31 shows an example of the process of step S31 of FIG. 28.

At process 1, a process of density conversion is executed to execute LOG conversion on brightness information of R, G and B values for conversion to density information of C, M and Y values.

At process 2, a process of under color removal is executed to take a Bk value out of the C, M and Y values.

At process 3, a process of masking is executed to make correction for unwanted absorption characteristics of C, M and Y toner or ink and to execute color matching.

At process 4, a process of gamma conversion is executed to adjust contrast and brightness according to an image.

Figure 32:
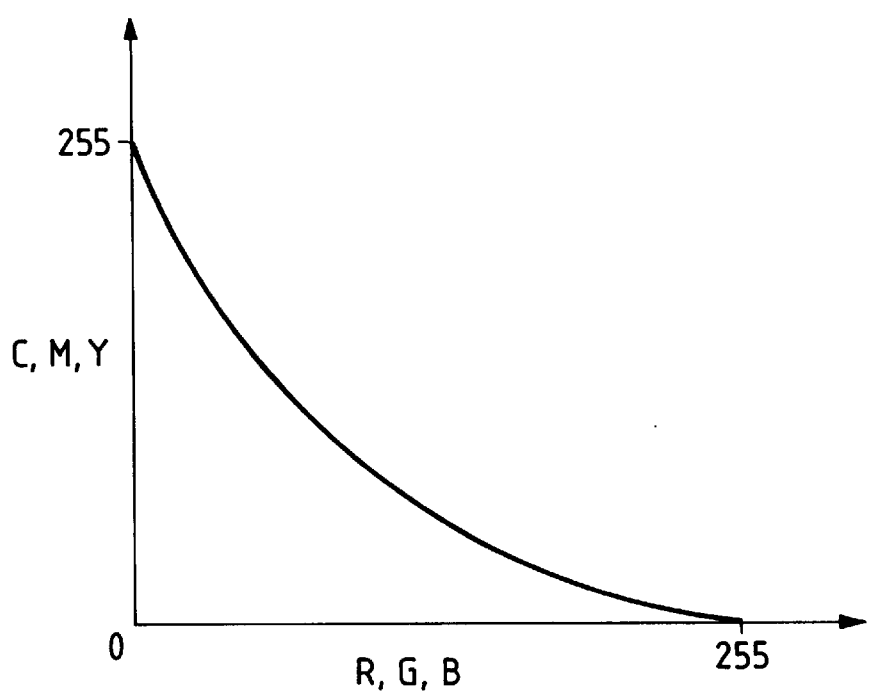
FIG. 32 shows an example of a table for use with process 1 of FIG. 31.

FIG. 32 shows an example of a table used at process 1 described above.

Density information of C, M and Y values (0 to 255) can be easily obtained for input brightness information of R, G and B values (0 to 255).

Figure 33:
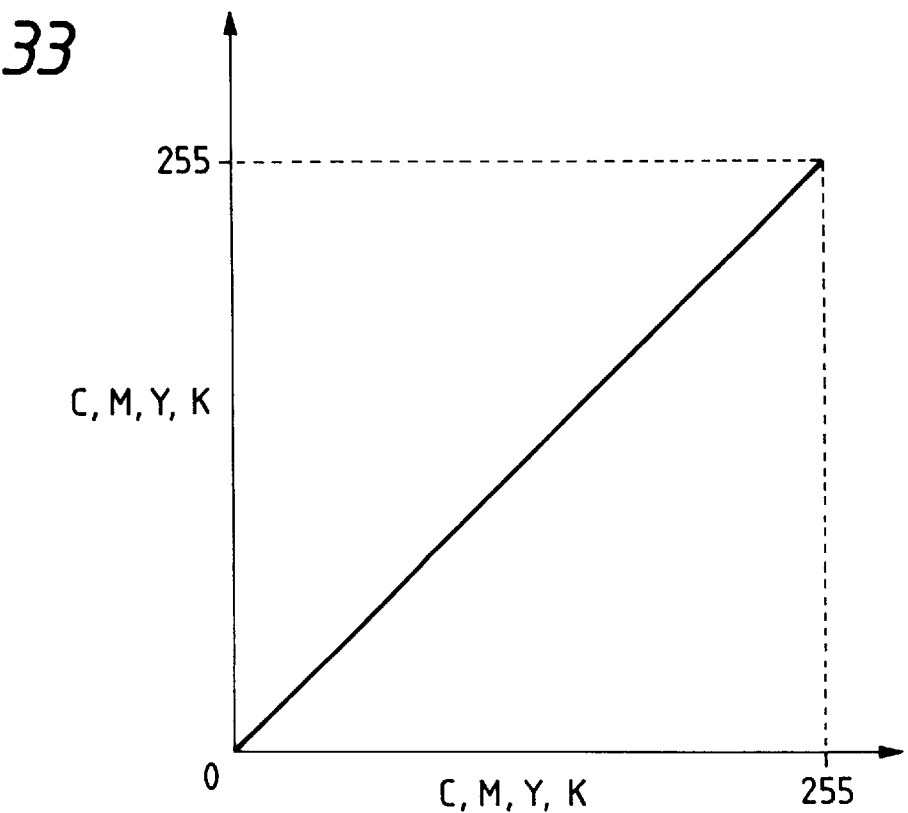
FIG. 33 shows an example of a table for use with process 4 of FIG. 31.

FIG. 33 shows an example of a table used at process 4 described above.

Output C, M, Y and K values (0 to 255) can be easily obtained for input C, M, Y and K values (0 to 255).

FIG. 34 shows an example of a process of process 3 described above.

Where, $r_{ij}$ (i, j=1, 2, 3) is a constant whose value varies depending on the type of CMM.

A processing speed can be improved by having the results of addition of parts enclosed with a dotted line in FIG. 34, in the form of a table.

Data in this table can be used as data for CMM process at step S126 of FIG. 13 or data for process at step S244 of FIG. 26. That is, a color matching process including color gamut compression can be executed at a high speed using a matrix operation.

(Example of a process where color matching is higher in accuracy, but longer in processing time) An example of the process of step S115 of FIG. 11 or step S224 of FIG. 23 is identical to the process of FIG. 27 described above.

FIG. 35 shows an example of the process of step S127 of FIG. 13 or step S245 of FIG. 26.

At step S40, the XYZ data converted at step S20 of FIG. 27 is converted to L*a*b* data. Then, processing proceeds to step S41.

At step S41, the above L*a*b* data is converted to printer dependent CMYK data, and then processing terminates.

FIG. 36 shows an example of the process of step S40 of FIG. 35.

Where, Xn, Yn and Zn are constants determined by which standard light source provided for by CIE to conform to.

Step S41 of FIG. 35 executes a process of converting L*a*b* including colors falling outside the color gamut of a printer to CMYK falling in the color gamut of the printer by means of color gamut compression.

There is a method for realizing this color gamut compression process which uses three-dimensional LUT (look-up table).

Figure 38:
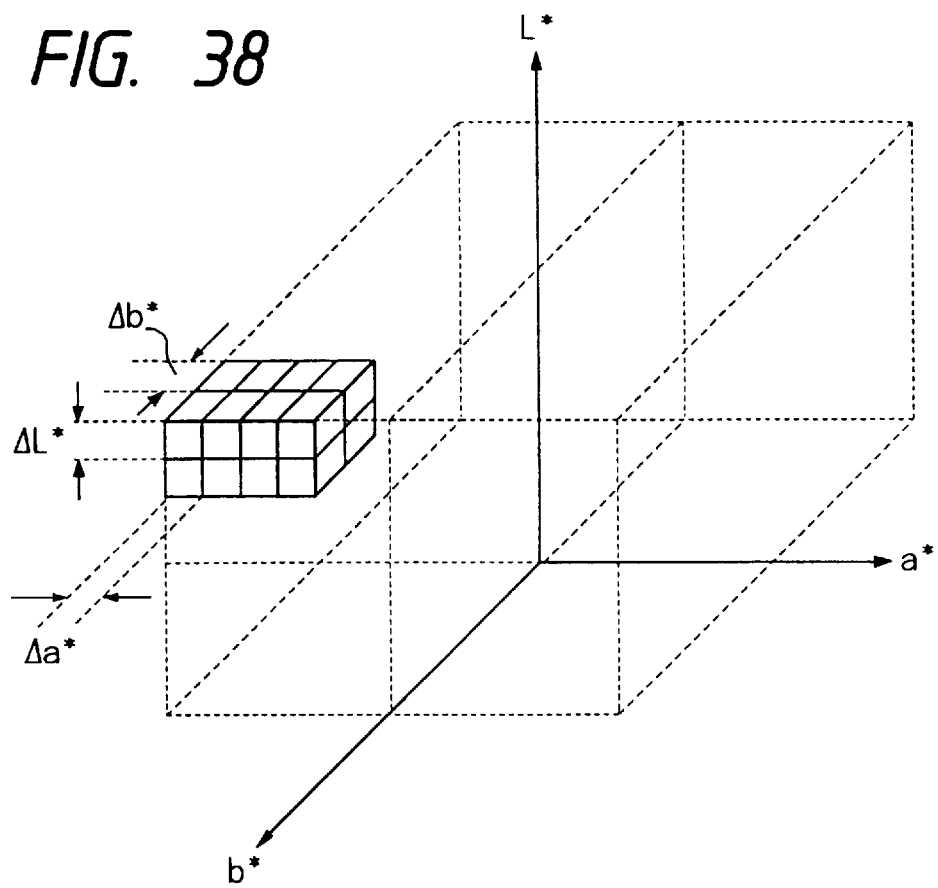
FIG. 38 shows an example of three-dimensional LUT.

FIG. 38 shows an example of LUT.

LUT is in such a three-dimensional table structure that a three-dimensional color solid of L*a*b* is divided equally spaced (ΔL*, Δa*, Δb*) in the direction of each coordinate axis and in the form of lattice. A value of CMYK corresponding to a sampled value of L*a*b* is stored at each vertex of each solid of lattice.

If the type of CMM is different, the above value of CMYK corresponding to a sampled value of L*a*b* is also different, and hence a value in the table described above becomes different accordingly.

Figure 39:
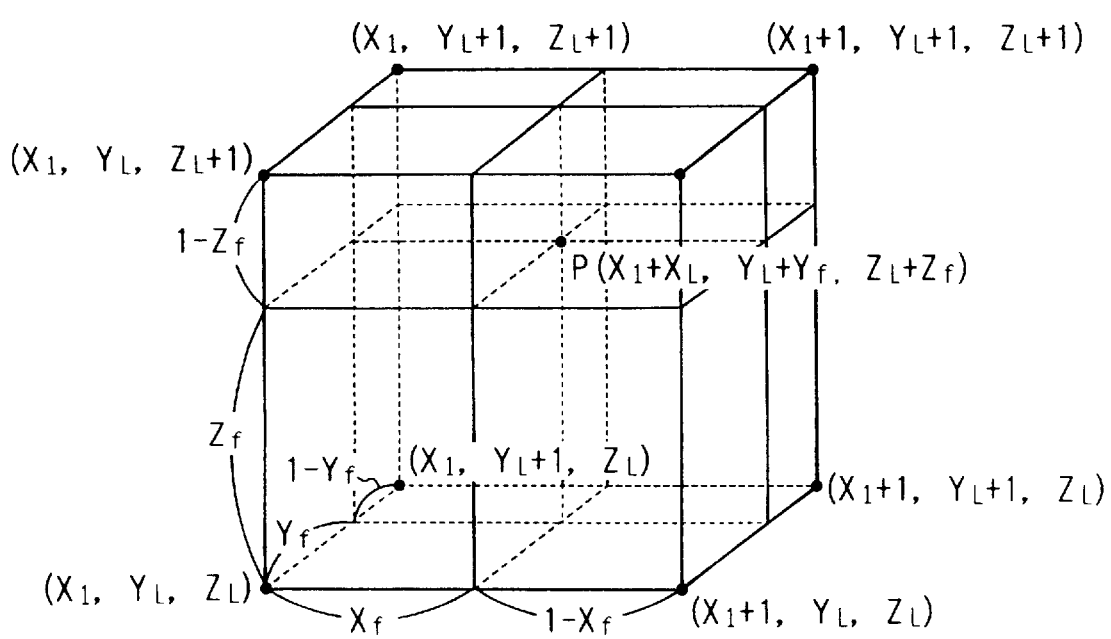
FIG. 39 is an enlarged view exemplifying one solid of lattice containing an input L*a*b* value to LUT.

FIG. 39 is an enlarged view exemplifying one solid of lattice containing an input L*a*b* value to LUT.

Here, a z direction corresponds to an L axis, an x direction to an a axis, and a y direction to a b* axis.

Let an input L*a*b* value be positioned at point P.

Take a vertex at near left of lattice as $(x_1, Y_1, z_1)$, suppose $\Delta L^* = \Delta a^* = \Delta b^* = 1$, and take a displacement from the vertex to point P as $x_p, y_p, z_p$. Then, coordinates and relation shown in FIG. 6 will hold.

If a value of CMYK stored at each vertex is expressed by U (x, y, z), then a value of CMY stored at point P, U ($x_1+x_p$, $y_1+y_f, z_1+z_f$), can be obtained by interpolation expressed by the following.

$$U(x_1 + x_f, y_1 + y_f, z_1 + z_f)$$
$$= U(x_1, y_1, z_1) \cdot (1 - x_f)(1 - y_f)(1 - z_f) +$$
$$U(x_1 + 1, y_1, z_1) \cdot x_f(1 - y_f)(1 - z_f) +$$
$$U(x_1, y_1 + 1, z_1) \cdot (1 - x_f)y_f(1 - z_f) +$$
$$U(x_1, y_1, z_1 + 1) \cdot (1 - x_f)(1 - y_f)z_f +$$
$$U(x_1, y_1 + 1, z_1 + 1) \cdot (1 - x_f)y_f z_f +$$
$$U(x_1 + 1, y_1, z_1 + 1) \cdot x_f(1 - y_f)z_f +$$
$$U(x_1 + 1, y_1 + 1, z_1) \cdot x_f y_f(1 - z_f) +$$
$$U(x_1 + 1, y_1 + 1, z_1 + 1) \cdot x_f y_f z_f$$

Thus, a value of CMY corresponding to the input L*a*b* value can be obtained using LUT and an interpolation process.

The abovementioned method using LUT can realize highly accurate matching, but has a drawback that processing time becomes longer due to the interpolation process involved.

Thus, a highly accurate color gamut check can be executed.

The construction described above allows the user to select CMM according to an application for image processing.

When a plurality of CMMs are different in accuracy as in the embodiment described above, the user can designate CMM based on an accuracy.

A feature of CMM is not limited to accuracy. For example, time required for processing or the like may be acceptable as a feature of CMM.

The present invention is not limited to a conversion process from scanner color space to printer color space, but may be applicable to combinations of other color spaces such as a conversion process from scanner color space to monitor color space and the like.

An "example of a process where color matching is rather lower in accuracy, but shorter in processing time" and an "example of a process where color matching is higher in accuracy, but longer in processing time" are not limited to the processes described above. For example, combinations of other processes such as the abovementioned color gamut compression by primary masking, color gamut compression by secondary masking and the like may be acceptable.

(Third embodiment)

The present embodiment relates to an example of a process to be executed in a case where when a device profile having information used for a process of a designated color matching method is selected as a source profile for executing a matching process based on the designated color matching method, the destination profile having information used for the process of the designated color matching method does not exist.

FIG. 42 shows the structure of the header information unit. Here, the header information unit stores a device model, a data size, a version, CMMSubtype, Gamutchecktype, an offset value for the CMM process information storage unit, and an offset value for the information storage unit for device color gamut check.

The structure of a profile and the structure of the CMM process information storage unit are similar to those for the first embodiment.

Figure 43:
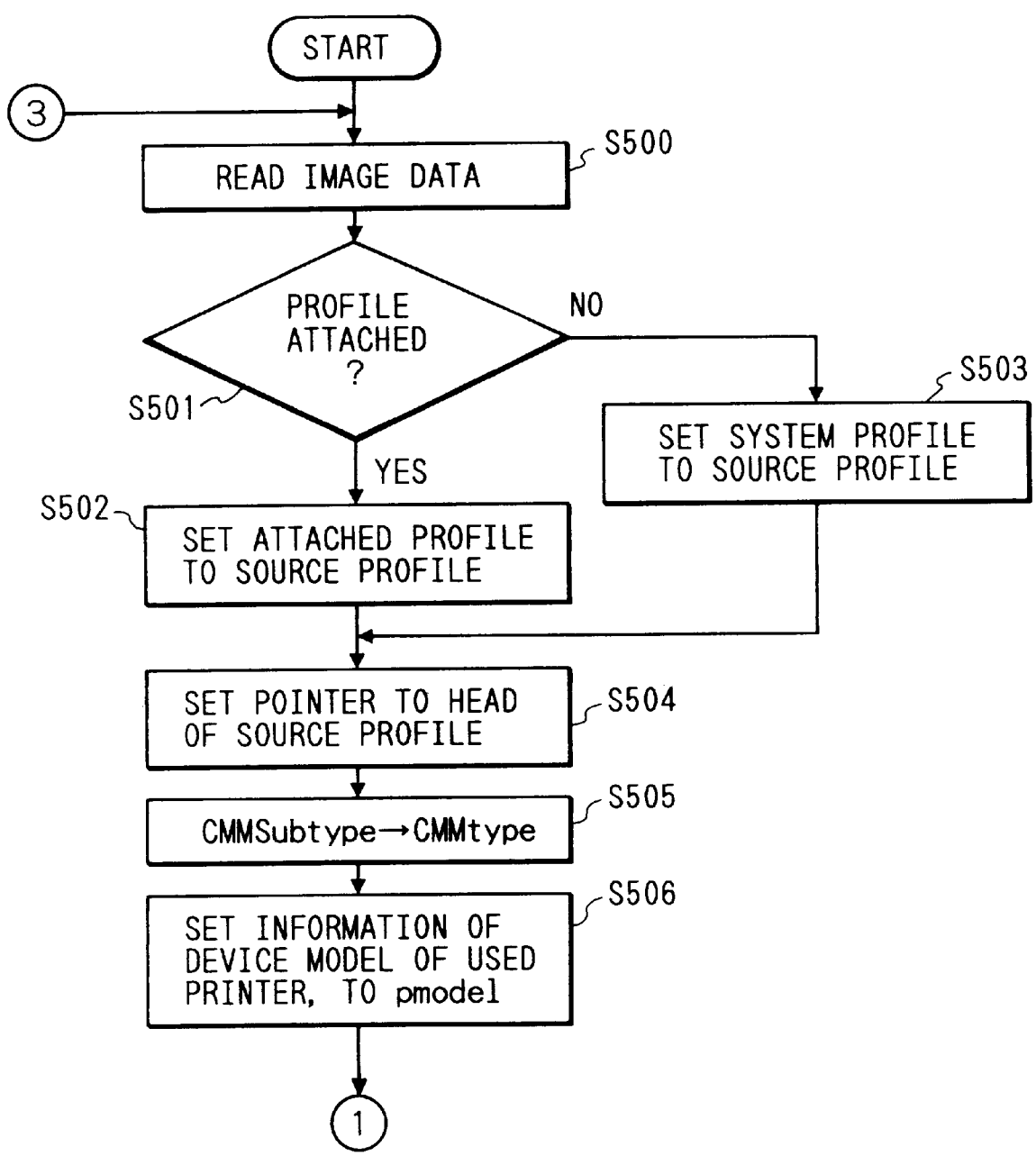
FIG. 43 is a flow chart showing a process of selecting a destination profile according to a color matching method described in a source profile for image data and executing color matching accordingly.
Figure 44:
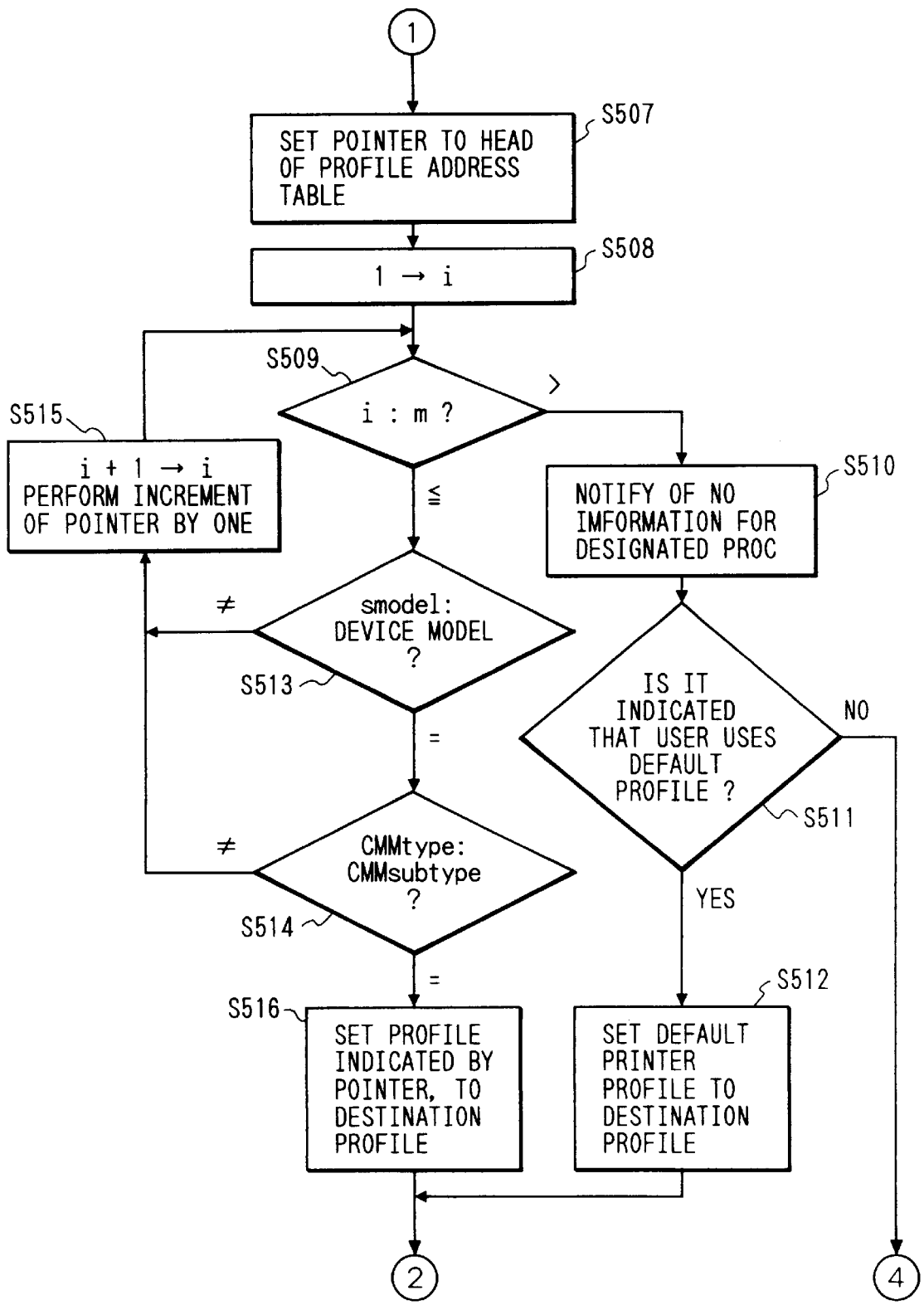
FIG. 44 is a flow chart showing a process of selecting a destination profile according to a color matching method described in a source profile for image data and executing color matching accordingly.
Figure 45:
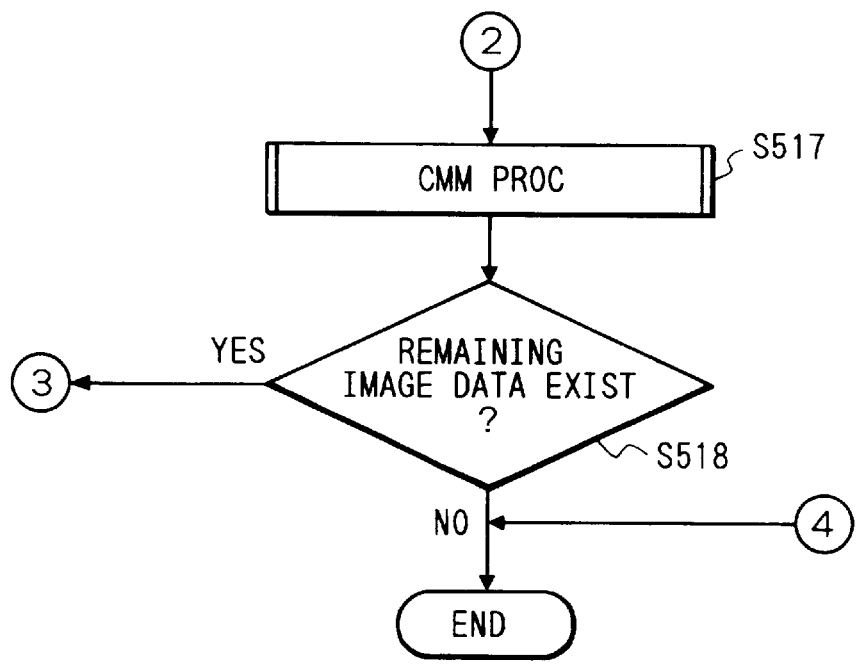
FIG. 45 is a flow chart showing a process of selecting a destination profile according to a color matching method described in a source profile for image data and executing color matching accordingly.

FIGS. 43 to 45 show flow charts illustrating a process of selecting a destination file based on a color matching method described in a source profile for image data and of executing color matching at the color reproduction process unit 2a.

At step S500, image data is read. Then, processing proceeds to step S501.

At step S501, whether a device profile is attached to the image data is checked.

If the profile is attached, processing proceeds to step S502, and the attached profile is set for a source profile. Then, processing proceeds to step S504.

If the profile is not attached, processing proceeds to step S503, and a system profile is set for a source profile. Then, processing proceeds to step S504.

Here, the system profile denotes one of color monitor profiles which are currently held for use. The system profile may be designated by the user or other method, for example, by such a method that an application automatically designates the system profile according to a printing speed of a color output device.

At step S504, a pointer is set to the head of the source profile. Then, processing proceeds to step S505.

At step S505, the contents of CMMSubtype which have been fetched from the header information unit of FIG. 11 based on the head address of a profile pointed by the pointer are set for CMMtype. Then, processing proceeds to step S506.

At step S506, the device model information of a printer in use is set for pmodel. Then, processing proceeds to step S507.

At step S507, a pointer is set to the head of a profile address table. Then, processing proceeds to step S508.

At step S508, 1 is set for constant i. Then, processing proceeds to step S508.

At step S509, the value of i and the value of m (constant) indicative of the number of profiles are compared.

If i is greater than m, processing proceeds to step S510 to notify the user of the absence of a profile necessary for a designated process.

At step S511, an instruction from the user whether to use a default printer profile for processing is waited for.

If an instruction to terminate processing is given, processing terminates.

If it is indicated that the user uses a default printer profile for processing, processing proceeds to step S512, and a previously prepared default printer profile is set for a destination profile. Then, processing proceeds to step S513.

Here, the default printer profile is a printer profile having information for a process of a default CMM.

If i is not greater than m, processing proceeds to step S513. Information about a device model which has been fetched from the header information unit based on the head address of a profile pointed by a pointer is compared with smodel.

If not equal, processing proceeds to step S515. i and the pointer are incremented by one, and then processing returns to step S509.

If equal at step S513, processing proceeds to step S514. CMMsubtype which has been fetched from the header information unit based on the head address of a profile pointed by a pointer is compared with CMMtype.

If not equal, processing proceeds to step S515. i and the pointer are incremented by one, and then processing returns to step S509.

If equal at step S514, processing proceeds to step S516. A printer profile pointed by a pointer is set for a destination profile, and then processing proceeds to step S517.

At step S517, a CMM process is executed. Then, processing proceeds to step S518.

At step S518, whether remaining image data exists is checked. If not, processing terminates. If present, processing returns to step S500.

Thus, even when an independent printer profile having information corresponding to a designated type of CMM does not exist, a previously prepared printer profile corresponding to a default CMM is selected as a destination profile for executing a color matching process.

Figure 46:
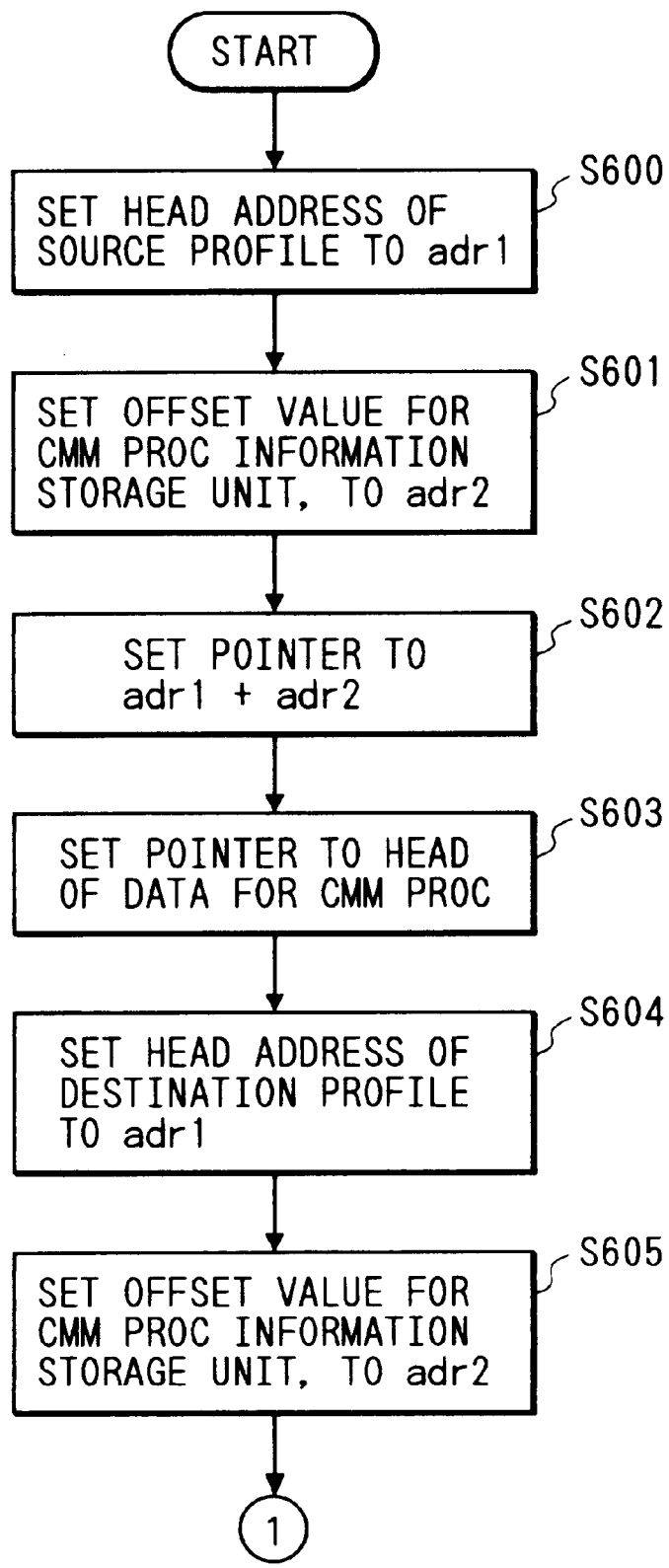
FIG. 46 is a flow chart showing the process of step S515 of FIG. 44.
Figure 47:
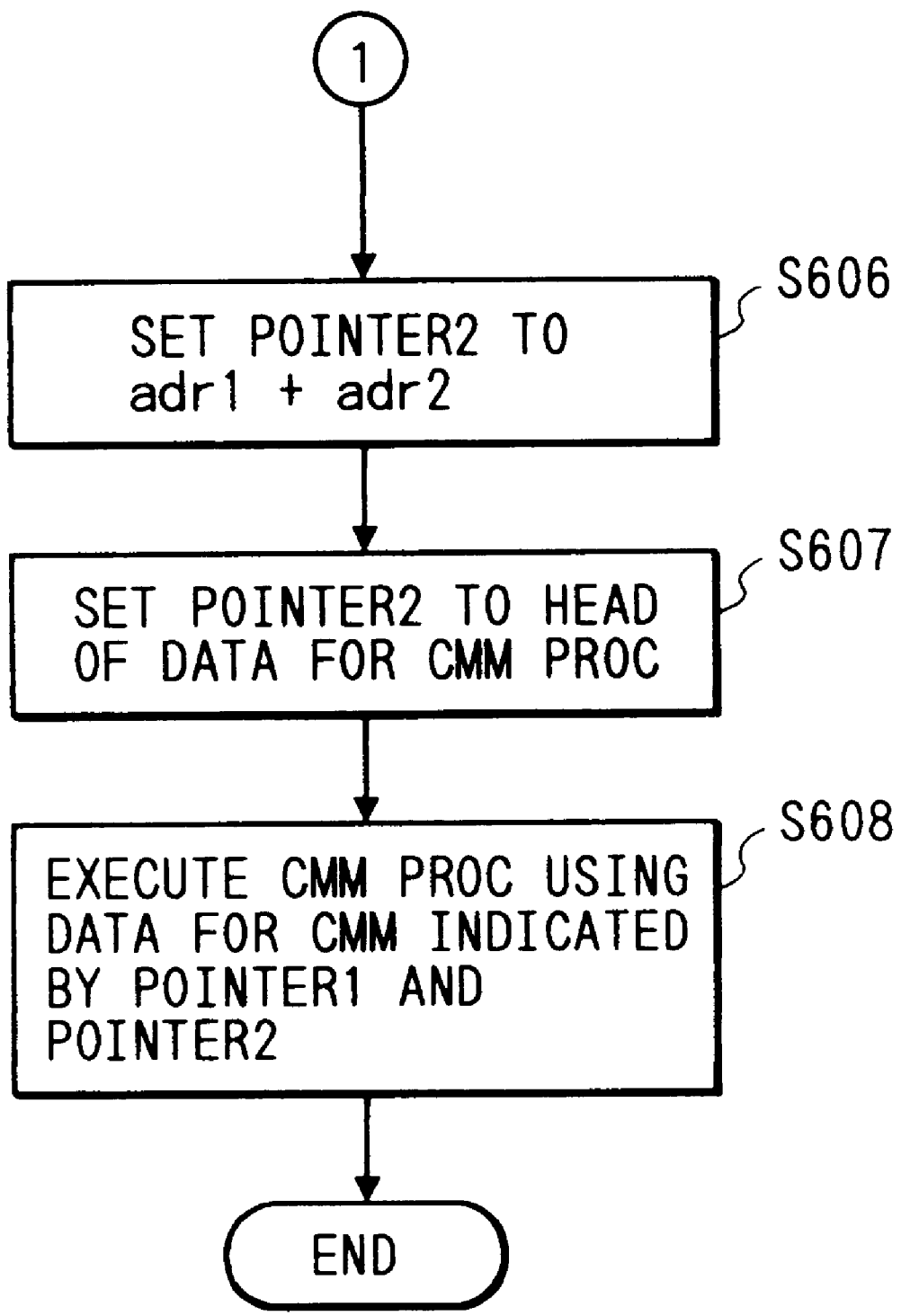
FIG. 47 is a flow chart showing the process of step S515 of FIG. 44.

FIGS. 46 and 47 show flow charts illustrating the process of step S517 of FIG. 45.

At step S600, the head address of a source profile is fetched, and the fetched head address is set for adr1. Then, processing proceeds to step S601.

At step S601, an offset value for the CMM process information storage unit in the header information unit is set for adr2. Then, processing proceeds to step S602.

At step S602, pointer1 is set to adr1+adr2. Then, processing proceeds to step S603.

At step S603, pointer1 is set to the head of data for CMM process in the CMM process information storage unit. Then, processing proceeds to step S604.

At step S604, the head address of a destination profile is fetched, and the fetched head address is set for adr1. Then, processing proceeds to step S605.

At step S605, an offset value for the CMM process information storage unit in the header information unit is set for adr2. Then, processing proceeds to step S606.

At step S606, pointer2 is set to adr1+adr2. Then, processing proceeds to step S607.

At step S607, pointer2 is set to the head of data for CMM process in the CMM process information storage unit. Then, processing proceeds to step S608.

At step S608, a CMM process is executed using data for CMM process pointed by pointer1 and pointer2, and then processing terminates.

Thus, a color matching process can be executed using information for CMM process of a designated source profile and of a selected destination profile.

If information for a designated process does not exist, the user will be notified of it and hence be able to recognize whether a process wanted by the user is executable or not. Processing can be continued or terminated as desired by the user.

In the example given above, a printer profile is taken up as a destination profile. However, a similar process is also applicable, for example, to a monitor profile or the like.

At step S704, a pointer is set to the head of the source profile. Then, processing proceeds to step S705.

At step S705, information about a designated type of CMM is set for CMMtype. Then, processing proceeds to step S706.

At step S706, the device model information of a printer in use is set for pmodel. Then, processing proceeds to step S707.

At step S707, a pointer is set to the head of a profile address table. Then, processing proceeds to step S708.

At step S708, 1 is set for constant i. Then, processing proceeds to step S709.

At step S709, the value of i and the value of m (constant) indicative of the number of profiles are compared.

If i is greater than m, processing terminates.

If not, processing proceeds to step S710. Information about a device model which has been fetched from the header information unit based on the head address of a profile pointed by a pointer is compared with pmodel.

If not equal, processing proceeds to step S711. i and the pointer are incremented by one, and then processing returns to step S709.

If equal at step S712, a printer profile pointed by a pointer is set for a destination profile, and then processing proceeds to step S713.

(Fourth embodiment)

The present embodiment relates to an example of a process of executing color matching on color image data in a case where when a device profile having information used for a process of a designated color matching method is selected for executing a matching process based on the designated color matching method, information used for the process of the designated color matching method does not exist in a source profile or a destination profile.

The structure of a profile, the structure of the header information unit, the structure of the CMM process information storage unit, and the structure of the data storage unit for CMM are similar to those for the second embodiment.

Figure 50:
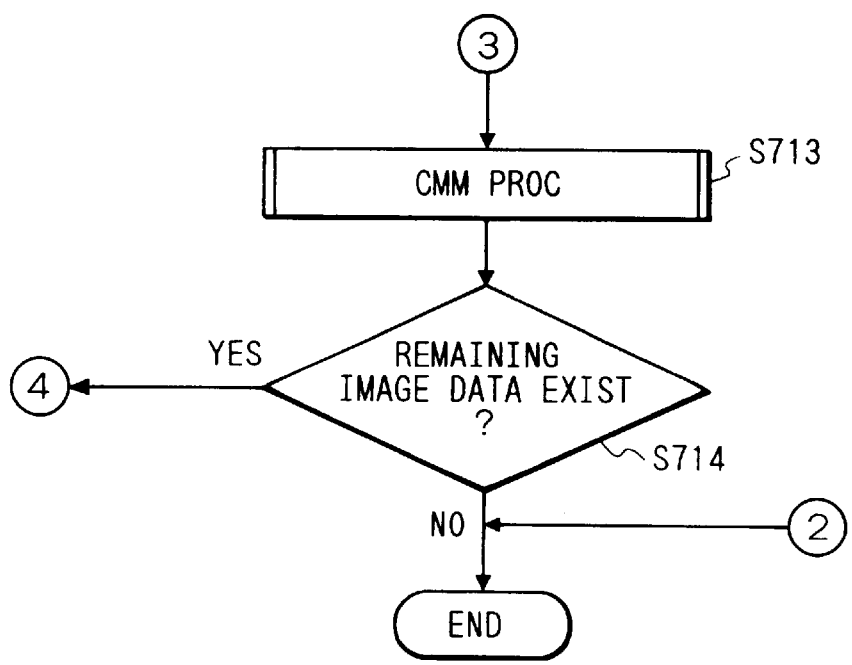
FIG. 50 is a flow chart showing a process of fetching information for use with the process of a designated color matching method from a source profile and a destination profile and executing color matching accordingly.
Figure 48:
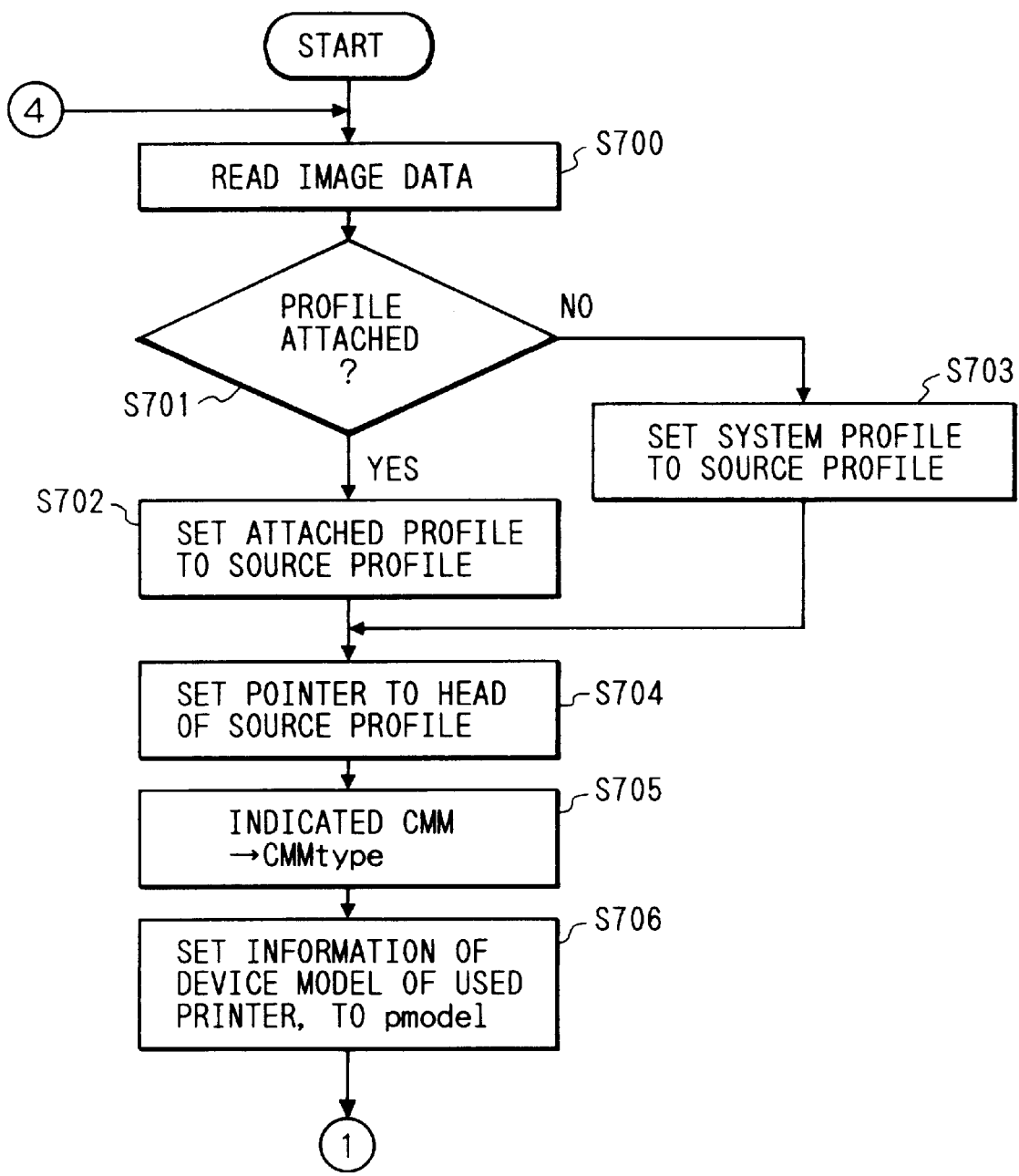
FIG. 48 is a flow chart showing a process of fetching information for use with the process of a designated color matching method from a source profile and a destination profile and executing color matching accordingly.
Figure 49:
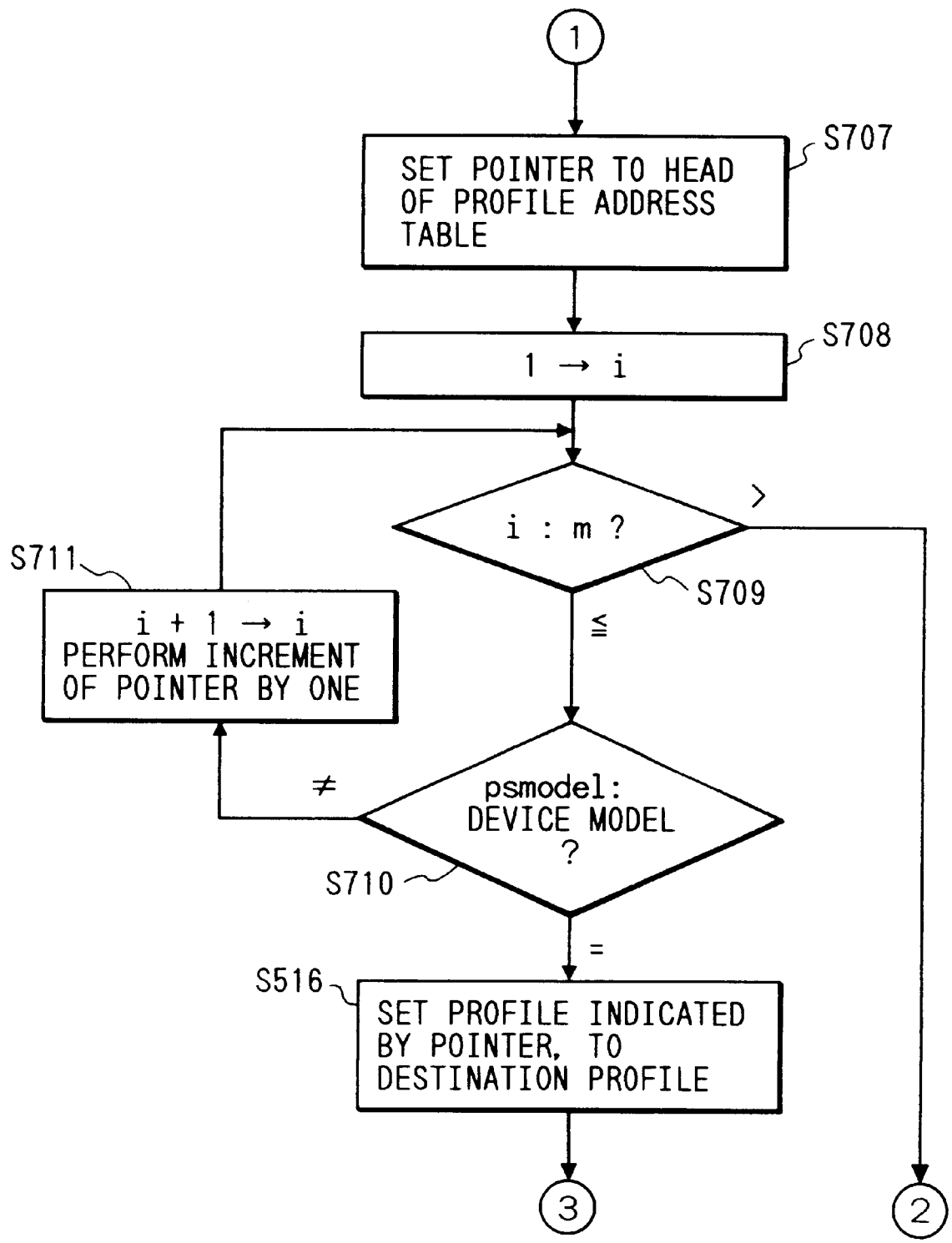
FIG. 49 is a flow chart showing a process of fetching information for use with the process of a designated color matching method from a source profile and a destination profile and executing color matching accordingly.

FIGS. 48 to 50 show flow charts illustrating a process of fetching information used for a process of a designated color matching method from a source profile and a destination profile and of executing color matching at the color reproduction process unit 2a.

At step S700, image data is read. Then, processing proceeds to step S701.

At step S701, whether a device profile is attached to the image data is checked.

If the profile is attached, processing proceeds to step S702, and the attached profile is set for a source profile. Then, processing proceeds to step S704.

If the profile is not attached, processing proceeds to step S703, and a system profile is set for a source profile. Then, processing proceeds to step S704.

Here, the system profile denotes a color monitor profile in current use.

At step S713, a CMM process is executed. Then, processing proceeds to step S714.

At step S714, whether remaining image data exists is checked. If not, processing terminates. If present, processing returns to step S700.

Figure 51:
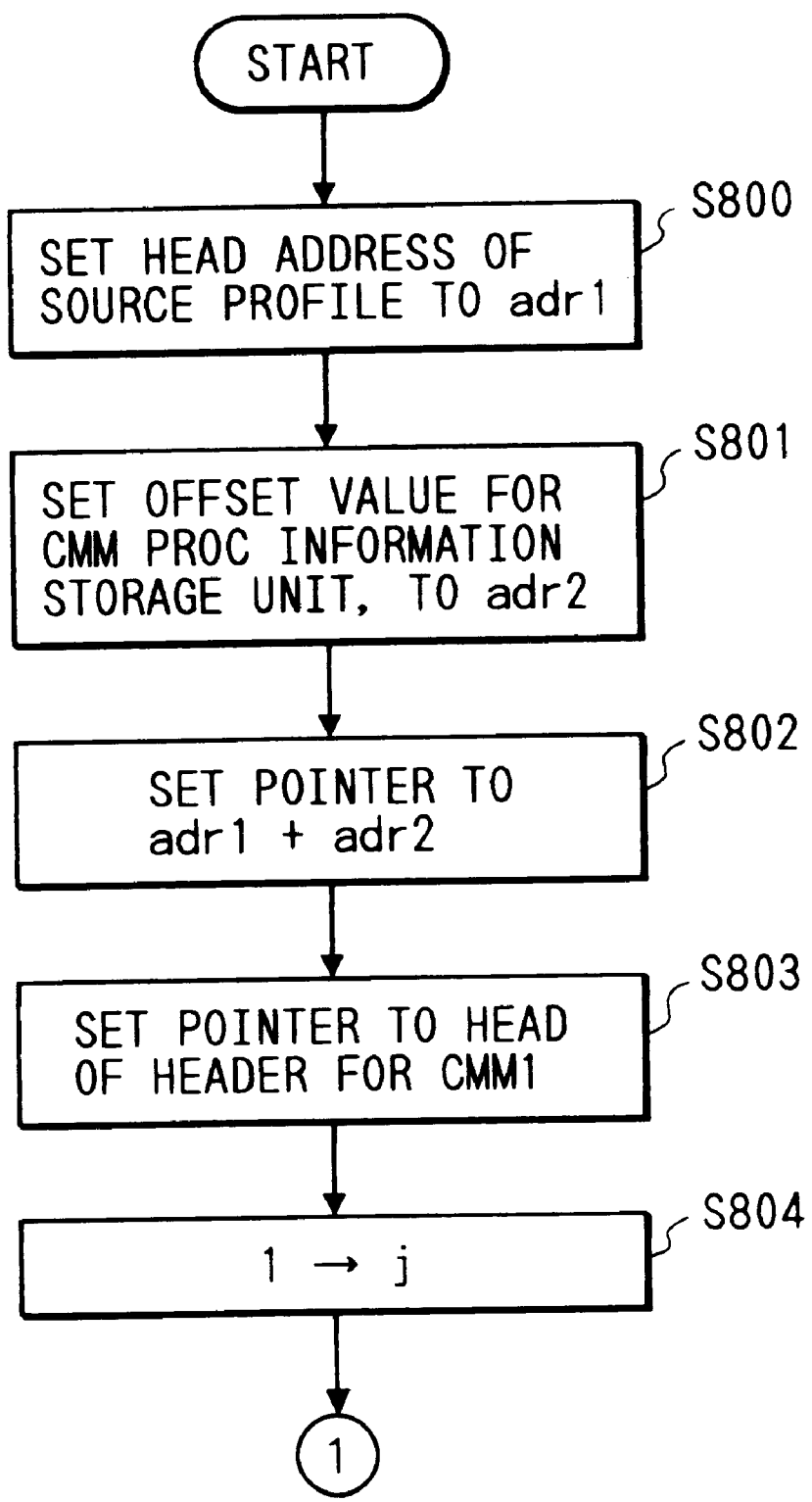
FIG. 51 is a flow chart showing the process of step S713 of FIG. 50.
Figure 52:
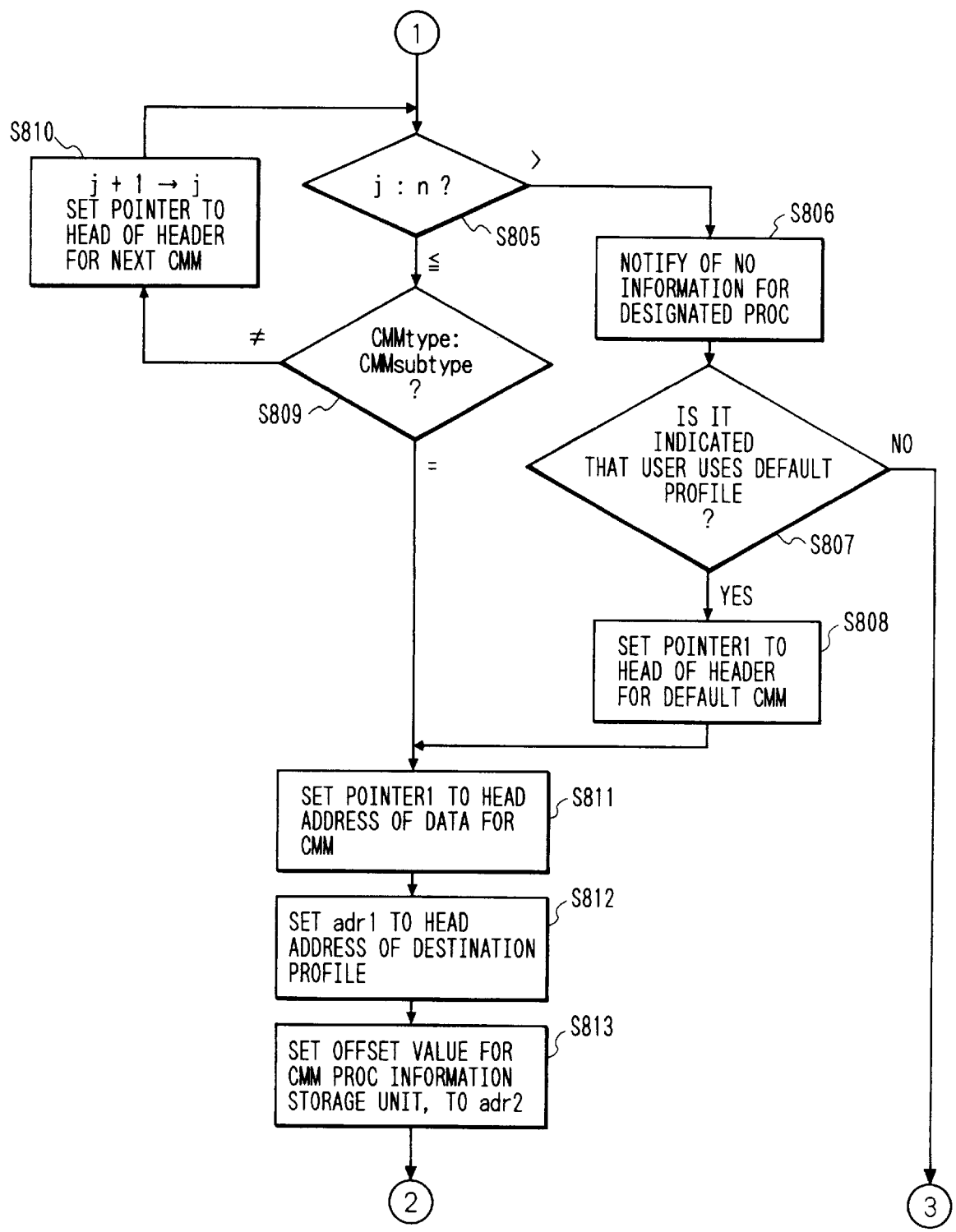
FIG. 52 is a flow chart showing the process of step S713 of FIG. 50.
Figure 53:
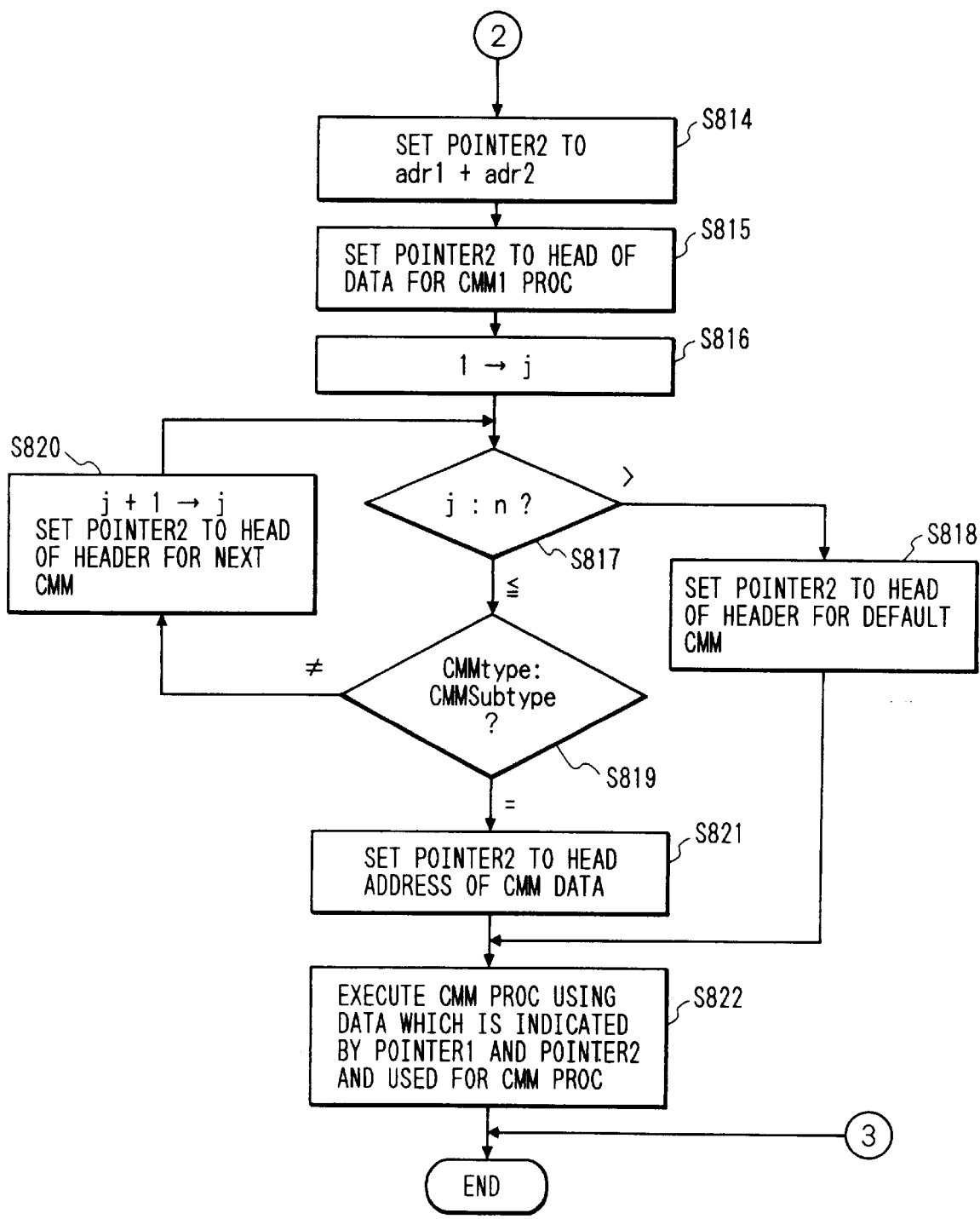
FIG. 53 is a flow chart showing the process of step S713 of FIG. 50.

FIGS. 51 to 53 show a flow chart illustrating the process of step S713 of FIG. 50.

At step S800, the head address of a source profile is fetched, and the fetched head address is set for adr1. Then, processing proceeds to step S801.

At step S801, an offset value for the CMM process information storage unit in the header information unit is set for adr2. Then, processing proceeds to step S802.

At step S802, pointer1 is set to adr1+adr2. Then, processing proceeds to step S803.

At step S803, pointer1 is set to the head of header for CMM1 in the CMM process information storage unit. Then, processing proceeds to step S804.

At step S804, 1 is set for constant j. Then, processing proceeds to step S805.

At step S805, the value of j and the value of n (constant) indicative of the number of profiles are compared.

If j is greater than n, processing proceeds to step S806 to notify the user of the absence of information necessary for a designated process.

At step S807, an instruction from the user whether to use a default printer profile for processing is waited for.

If an instruction to terminate processing is given, processing terminates.

If it is indicated that the user uses a default printer profile for processing, processing proceeds to step S808, and pointer1 is set to the head of header for a default CMM. Then, processing proceeds to step S811.

Here, the default CMM is a CMM predetermined as default, i.e. one of n types of CMMs.

If j is not greater than n, processing proceeds to step S809. CMMsubtype which has been fetched from the header for CMM pointed by a pointer is compared with CMMtype.

If not equal, processing proceeds to step S810. j is incremented by one, and the pointer is set to the head of header for a next CMM. Then, processing returns to step S805.

If equal at step S809, pointer1 is set to the head address of CMM data for CMM pointed by a pointer. Then, processing proceeds to step S516.

At step S811, pointer1 is set to the head address of data for CMM. Then, processing proceeds to step S812.

At step S812, the head address of a destination profile is fetched, and the fetched head address is set for adr1. Then, processing proceeds to step S813.

At step S813, an offset value for the CMM process information storage unit in the header information unit is set for adr2. Then, processing proceeds to step S814.

At step S814, pointer2 is set to adr1+adr2. Then, processing proceeds to step S815.

At step S815, pointer2 is set to the head of header for CMM1. Then, processing proceeds to step S414.

At step S816, 1 is set for constant j. Then, processing proceeds to step S817.

At step S817, the value of j and the value of n (constant) indicative of the number of profiles are compared.

If j is greater than n, processing proceeds to step S818. Pointer2 is set to the head of header for a default CMM. Then, processing proceeds to step S822.

Here, the default CMM is a CMM predetermined as default, i.e. one of n types of CMMs.

If j is not greater than n, processing proceeds to step S819. CMMSubtype which has been fetched from the header for CMM pointed by a pointer is compared with CMMtype.

If not equal, processing proceeds to step S820. j is incremented by one, and the pointer is set to the head of header for a next CMM. Then, processing returns to step S817.

If equal at step S819, processing proceeds to step S821. Pointer1 is set to the head address of CMM data for CMM pointed by a pointer. Then, processing proceeds to step S822.

At step S822, a CMM process is executed using data for CMM process pointed by pointer1 and pointer2, and then processing terminates.

Thus, even when information used for a process of a designated CMM does not exist in a source profile or a printer profile, a color matching process can be executed using a process information of a predetermined default CMM.

If information for a designated process does not exist, the user will be notified of it and hence be able to recognize whether a process wanted by the user is executable or not.

Processing can be continued or terminated as desired by the user.

The present invention may be carried out by software or hardware means.

In the example given above, a printer profile is taken up as a destination profile. However, a similar process is also applicable to a monitor profile.

As described above, according to the present invention, in a color management system or the like, the provision of a method for selecting a color matching process for image processing renders a color matching process selectable according to an application.

Also, even when information used for a designated color matching process does not exist, the color matching process can be executed using previously prepared information.

By checking to see if information used for a designated color matching process exists and notifying the user of the results of the check, the user can recognize whether the designated color matching process can be executed or not.

Also, the user can select a color matching process giving preference to accuracy or the one giving preference to speed. For example, the user may execute a color matching process giving preference to speed when the printing speed of a color output device is fast. Thus, it is possible to execute a color matching process more suited to an application.

What is claimed is:

1. An image processing apparatus comprising:

storing means for storing a plurality of profiles;

searching means for searching, from among the plurality of profiles, for a profile corresponding to the profile indication information;

informing means for informing a user that the profile corresponding to the profile indication information has not been stored in said storing means, in a case where the profile corresponding to the profile indication information could not be found by said searching means; and input means for inputting a user instruction concerning whether or not the color matching process is to be performed by using a profile different from the profile corresponding to the profile indication information.

2. An apparatus according to claim 1, wherein the selected profile is a destination profile, and the profile indication information is described in a source profile.

3. An apparatus according to claim 2, wherein the source profile is added to the color image data to produce an added profile.

4. An apparatus according to claim 2, wherein the processing means performs the color matching process based on the source profile and the destination profile.

5. An apparatus according to claim 2, further comprising:

judging means for judging whether the source profile has been added to the color image data; and setting means for setting the added profile as the source profile in a case that the source profile has been added to the color image data, and setting a system profile as the source profile in a case that the source profile has not been added to the color image data.

6. An apparatus according to claim 5, wherein the system profile is a profile which has been previously designated by a user.

7. An apparatus according to claim 5, wherein the system profile is a profile which corresponds to a monitor.

8. An image processing apparatus comprising:

input means for inputting color image data;

setting means for setting, based on a manual instruction from a user, a process type for a color matching process from among a plurality of process types having different respective degrees of accuracy, and a color matching method for the color matching process from among a plurality of color matching methods having different respective characteristics; and processing means for performing the color matching process in accordance with the set process type and the set color matching method.

9. An image processing apparatus comprising:

input means for inputting color image data;

setting means for setting, based on a manual instruction from a user, a process type for a color matching process from among a plurality of process types having different respective degrees of speed, and a color matching method for the color matching process from among a plurality of color matching methods having different respective characteristics; and processing means for performing the color matching process in accordance with the set process type and the set color matching method.

10. An image processing method comprising the steps of:

storing a plurality of profiles;

searching, from among the plurality of profiles, for a profile corresponding to profile indication information;

performing a color matching process by using the searched profile corresponding to the profile indication information;

informing a user that the profile corresponding to the profile indication information was not stored in said storing step, in a case where the profile corresponding to the profile indication information could not be found in said searching step; and inputting a user instruction concerning whether or not the color matching process is to be performed by using a profile different from the profile corresponding to the profile indication information.

11. An image processing method comprising the steps of:

inputting color image data;

setting, based on a manual instruction from a user, a process type for a color matching process from among a plurality of process types having different respective degrees of accuracy, and a color matching method for the color matching process from among a plurality of color matching methods having different respective characteristics; and performing the color matching process in accordance with the set process type and the set color matching method.

12. A method according to claim 11, further comprising a step of setting a profile according to the process type for the color matching method designated in the designating step;

wherein the step for performing a color matching process performs the color matching process using the profile set in the setting step.

13. An image processing method according to claim 11, wherein data which has been processed by the color matching process is output to a color output device.

14. A method according to claim 11, wherein the color matching process includes a first mode which uses a matrix calculation process and second mode which uses a look-up table (LUT) and an interpolation process; and wherein a speed of the first mode is greater than a speed of the second mode.

15. An image processing method comprising the steps of:

inputting color image data;

setting, based on a manual instruction from a user, a process type for a color matching process from among a plurality of process types having different respective degrees of speed, and a color matching method for the color matching process from among a plurality of color matching methods having different respective characteristics; and performing the color matching process in accordance with the set process type and the set color matching method.

16. A method according to claim 15, further comprising a step of setting a profile according to the process type for the color matching method designated in the designating step;

wherein the step of performing a color matching process performs the color matching process using the profile set in the setting step.

17. A method according to claim 15, wherein data which has been processed by the color matching process is output to a color output device.

18. A method according to claim 15, wherein the color matching process includes a first mode which uses a matrix calculation process and second mode which uses a look-up table (LUT) and an interpolation process; and wherein an accuracy of the second mode is higher than an accuracy of the first mode.

* * * * *

UNITED STATES PATENT AND TRADEMARK OFFICE
CERTIFICATE OF CORRECTION

PATENT NO.   : 6,044,173
DATED        : March 28, 2000
INVENTOR(S)  : Shuichi Kumada Page 1 of 1

It is certified that error appears in the above-identified patent and that said Letters Patent is hereby corrected as shown below:

Title page:
The following should be inserted before Related U.S. Application Data:
-- [*] Notice: This patent issued on a continued prosecution application filed under 37 CFR § 1.53 (d), and is subject to the twenty-year patent term provisions of 35 U.S.C. § 154 (a) (2). --

Column 1:
Line 4, "is continuation" should read -- is a continuation --.

Column 8:
Line 17, "Sill." should read -- S111. --.

Column 13:
Line 29, "4. The" should read -- 4. ¶The --.

Column 14:
Line 22, "time) An" should read -- time). ¶An --;
Line 58, "L axis," should read --L* axis, --;
Line 59, "a axis," should read -- a* axis, --; and
Line 62, "AL*" should read -- ΔL* --.

Signed and Sealed this

Ninth Day of October, 2001

Attest:

*Nicholas P. Godici*

NICHOLAS P. GODICI
*Attesting Officer*   *Acting Director of the United States Patent and Trademark Office*